July 7, 1942.　　　　R. L. MULLER　　　　2,288,916
CALCULATING MACHINE
Filed Feb. 6, 1939　　　　9 Sheets-Sheet 1

INVENTOR
BY Robert L. Muller
Davis, Lindsay, Smith, & Shonts
ATTORNEYS

Fig. 3-A.

INVENTOR
Robert L. Muller
BY Davis, Lindsey, Smith & Shantz
ATTORNEYS

July 7, 1942.  R. L. MULLER  2,288,916
CALCULATING MACHINE
Filed Feb. 6, 1939  9 Sheets-Sheet 3

Fig. 3-B.

INVENTOR
Robert L. Muller
BY Davis, Lindsey, Smith, & Shonts
ATTORNEYS

July 7, 1942.  R. L. MULLER  2,288,916
CALCULATING MACHINE
Filed Feb. 6, 1939  9 Sheets-Sheet 4

INVENTOR
Robert L. Muller
BY Davis, Lindsey, Smith, & Shonts
ATTORNEYS

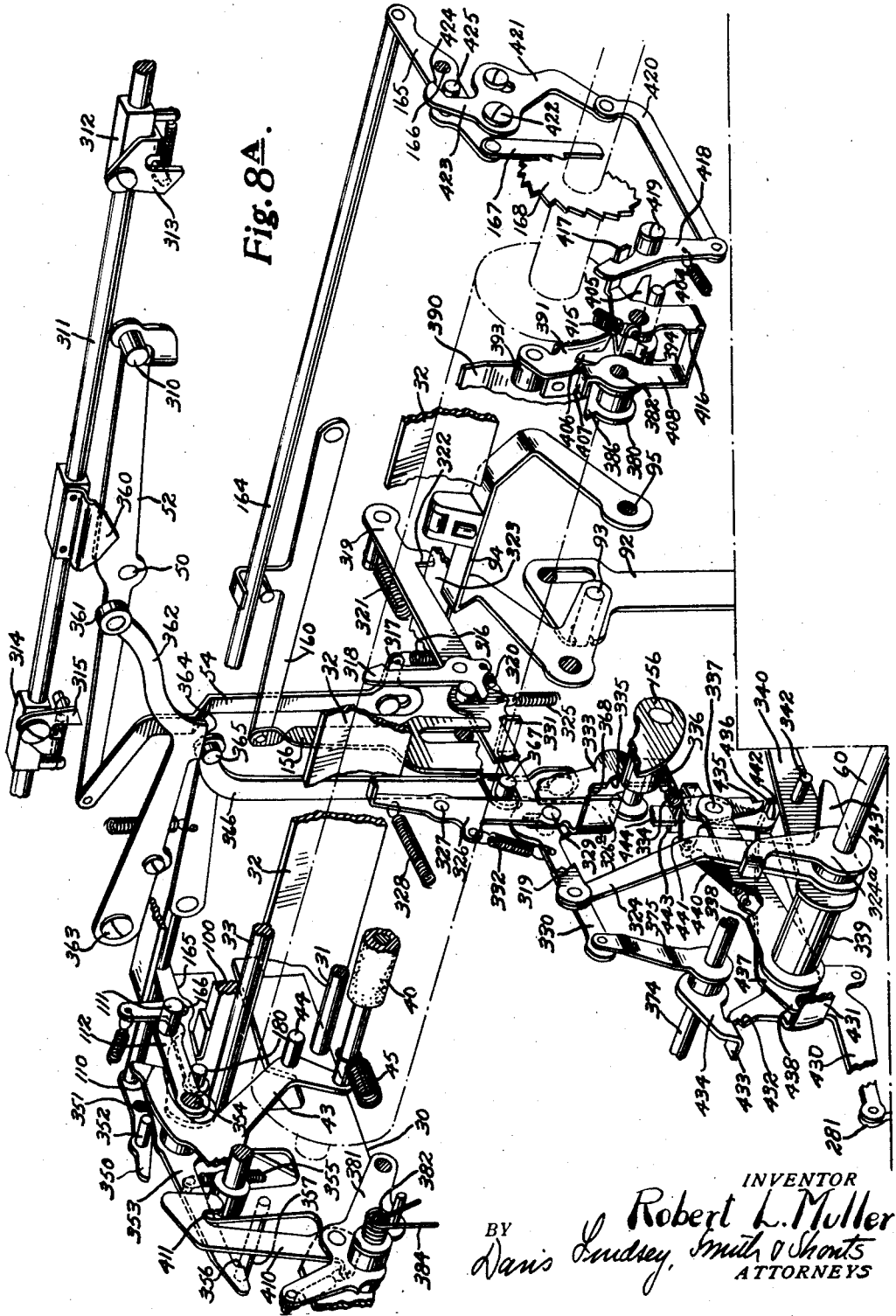

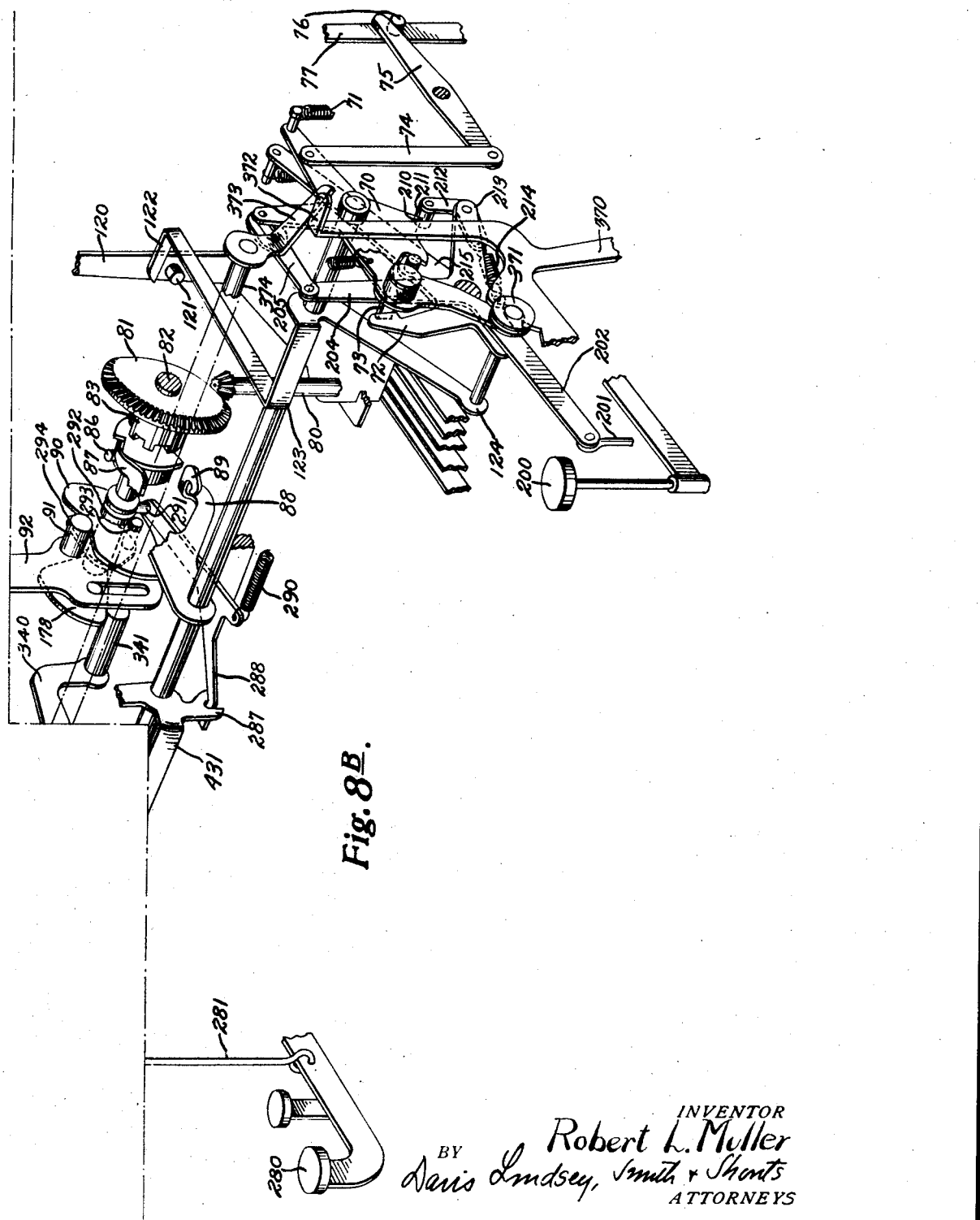

INVENTOR
Robert L. Muller
BY Davis Lindsey, Smith & Shorts
ATTORNEYS

July 7, 1942.     R. L. MULLER     2,288,916
CALCULATING MACHINE
Filed Feb. 6, 1939     9 Sheets-Sheet 8

INVENTOR
Robert L. Muller
BY
Davis Lindsey, Smith & Shonts
ATTORNEYS

July 7, 1942.  R. L. MULLER  2,288,916
CALCULATING MACHINE
Filed Feb. 6, 1939　　9 Sheets-Sheet 9

INVENTOR
Robert L. Muller
BY Davis, Lindsey, Smith, & Shonts
ATTORNEYS

Patented July 7, 1942

2,288,916

UNITED STATES PATENT OFFICE 2,288,916

CALCULATING MACHINE

Robert L. Muller, Detroit, Mich., assignor to Burroughs Adding Machine Company, Detroit, Mich., a corporation of Michigan Application February 6, 1939, Serial No. 254,790

73 Claims. (Cl. 235—58)

This invention relates to a calculating machine, particularly to the paper handling equipment thereof.

It is frequently necessary, in certain classes of bookkeeping and accounting work, to keep a running record of all the entries made in the machine for a given period of time, and, during the making of such entries, to insert a number of individual ledger work sheets on which only a few entries are made. The record sheet is usually held in the machine during the entire run while the work sheets are inserted and removed from a front-feed throat that may be opened and closed. In order to speed up operations, it is desirable to have the front-feed throat controlled automatically and to be operated by power so that the operator has very little to do other than to insert and remove the work sheets and make the entries in the machine.

The present invention is directed to certain improvements in this type of paper handling equipment and it has the following objects in view:

The general object of the invention is to provide an improved paper handling equipment for calculating machines.

A more particular object is to provide an improved paper handling equipment of the front-feed type in which the power of an electric motor is used to operate the mechanism independently of the cycling operation of the machine.

A further object is to provide an improved equipment of the class described in which the front-feed throat is automatically closed upon depression of the first amount key in the entry of an item with the throat open.

Other and more particular objects will appear from the following specification and drawings.

An embodiment of the invention is shown in the accompanying drawings in which.

Figure 4:
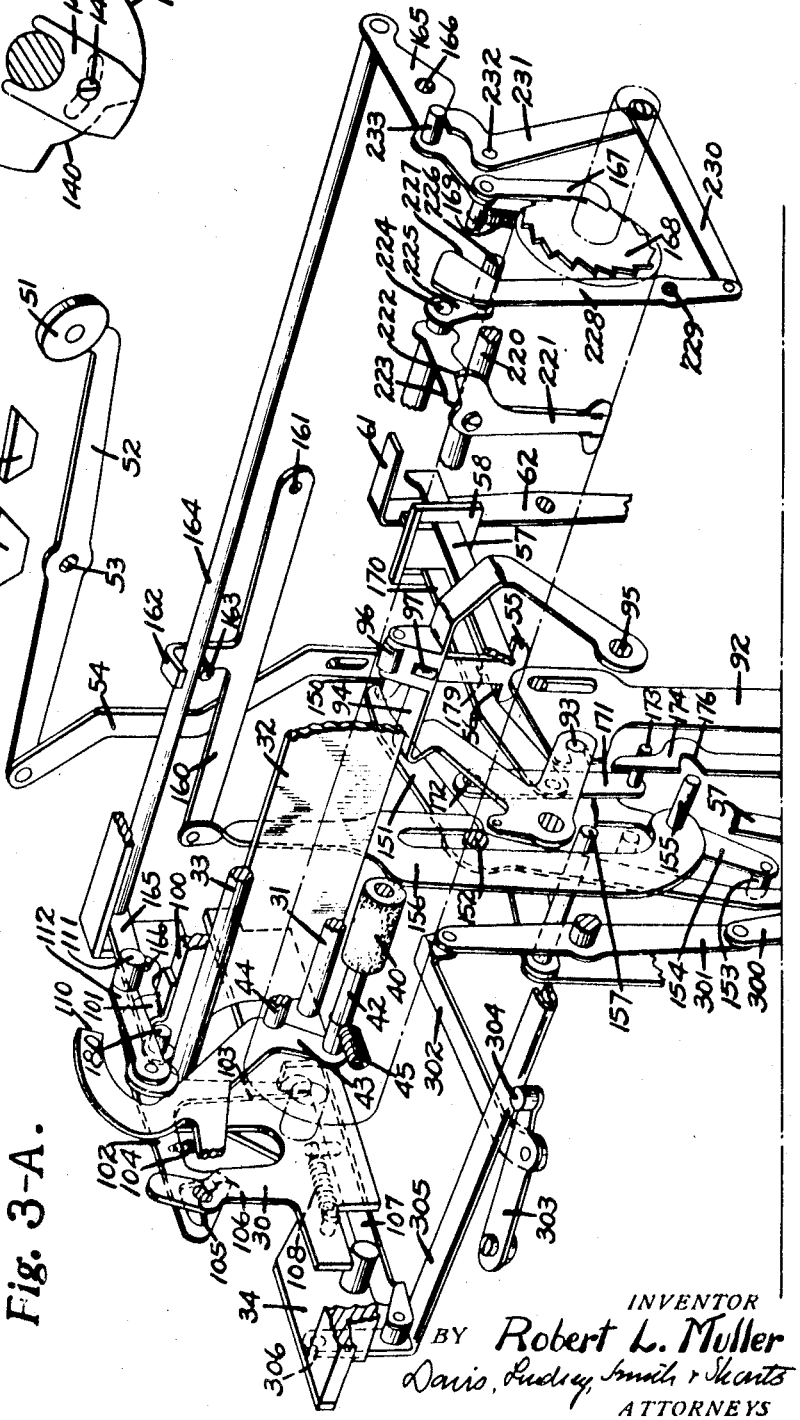
Figure 5:
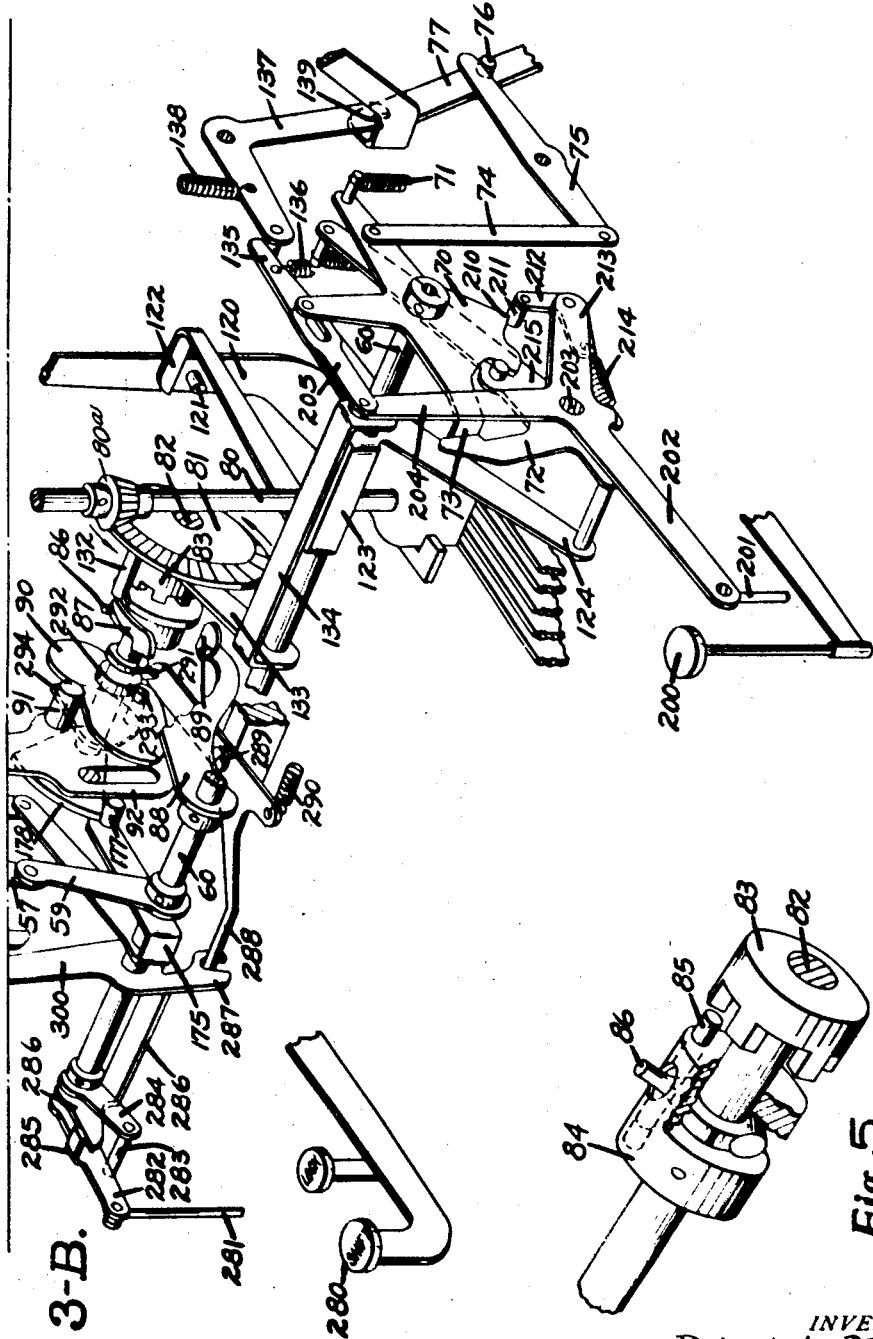
Figure 7:
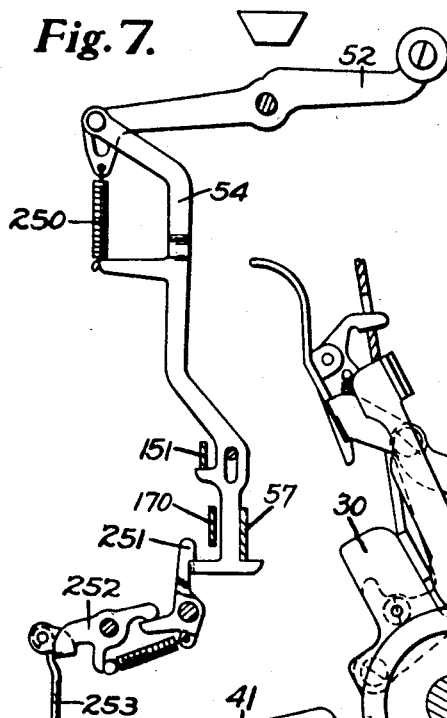
Figure 6:
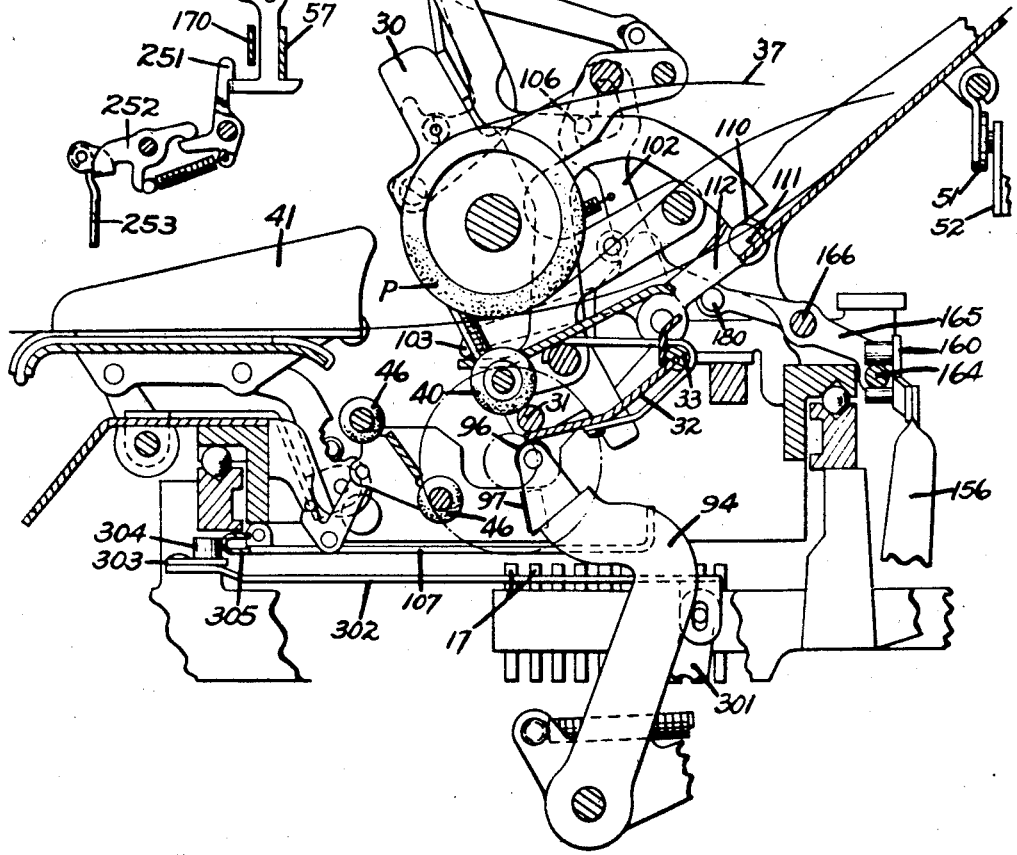

Fig. 3—A is a perspective view of the upper half of the principal parts constituting the present invention;

Fig. 3—B is a perspective of the lower half of the parts, said figure fitting below Fig. 3—A to make a complete perspective;

Fig. 4 is a detail side elevation of one of the cams used;

Fig. 5 is a detail perspective of the clutch;

Fig. 6 is a sectional side elevation showing the platen and the paper holding equipment; and Fig. 7 is a detail view of a modified form of construction.

Figure 9:
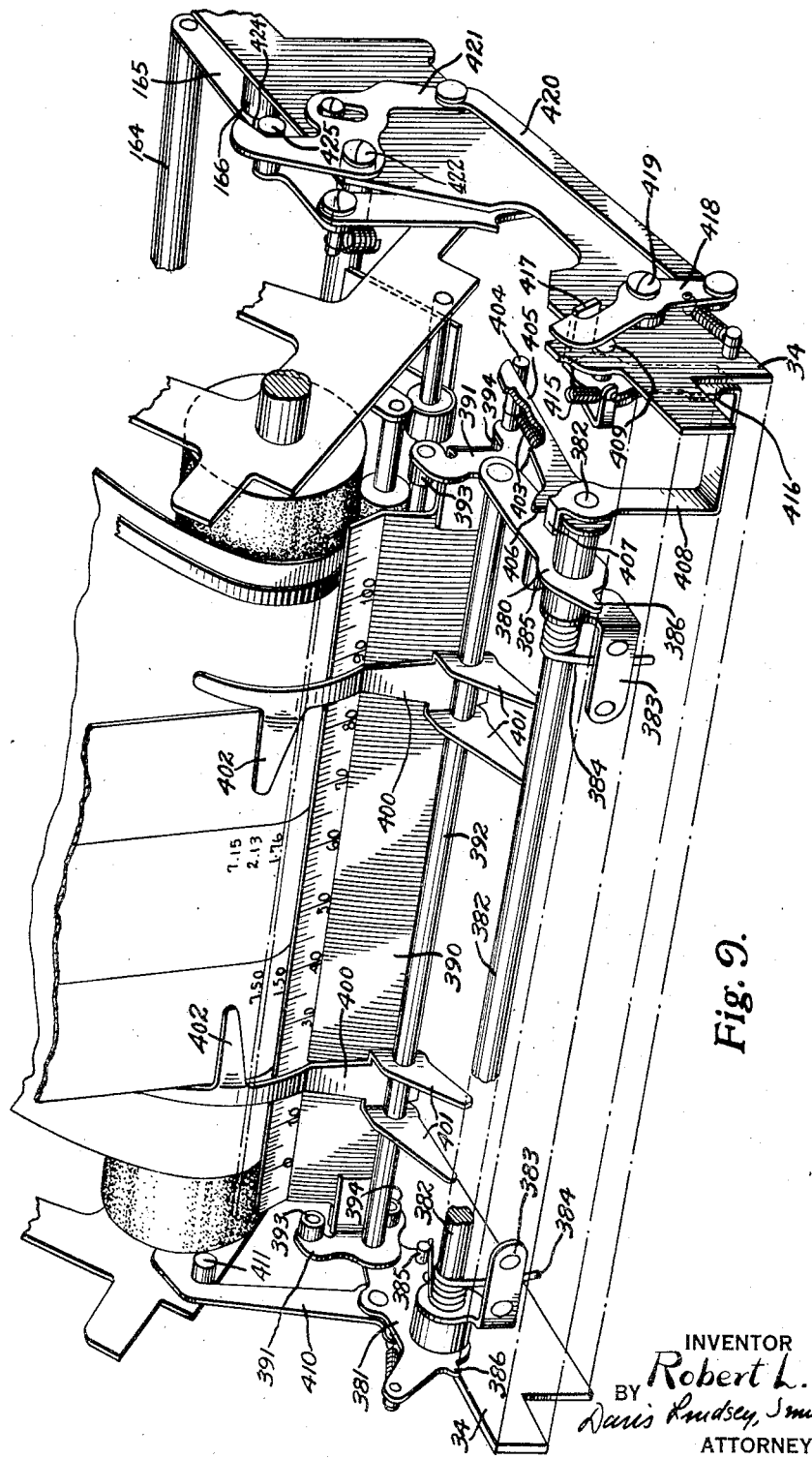
Figure 10:
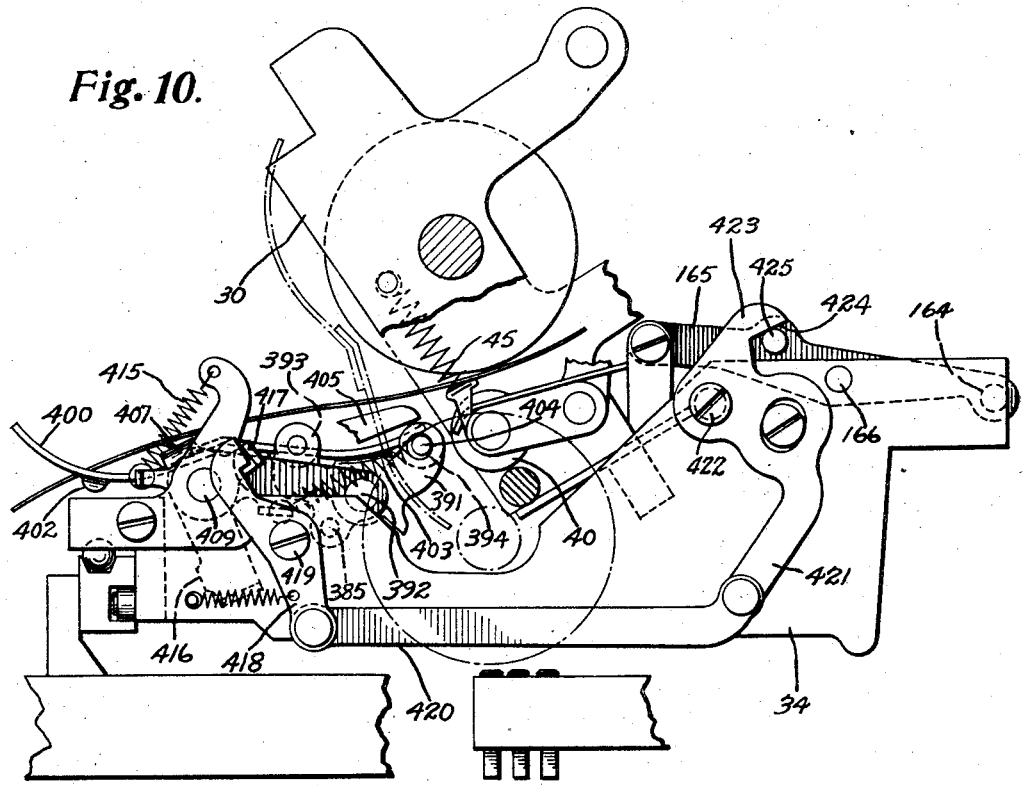
Figure 11:
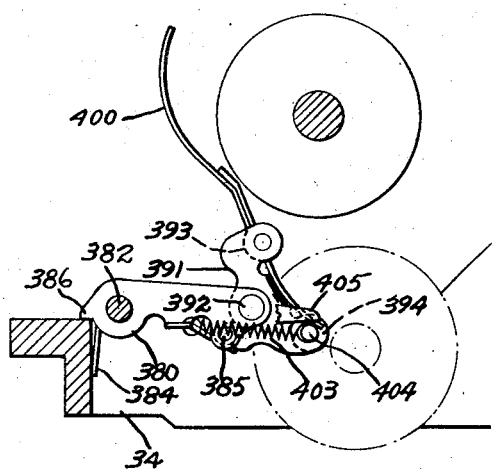
Figure 12:
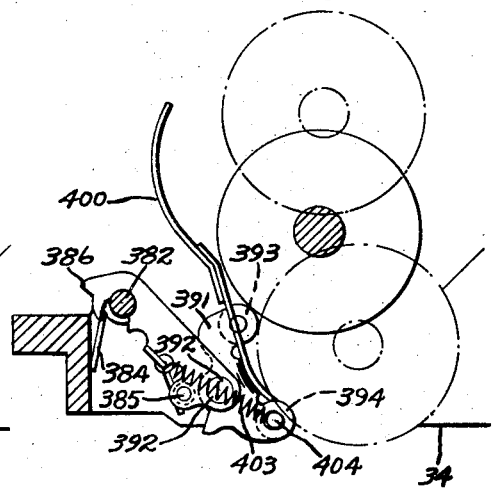
Figure 13:
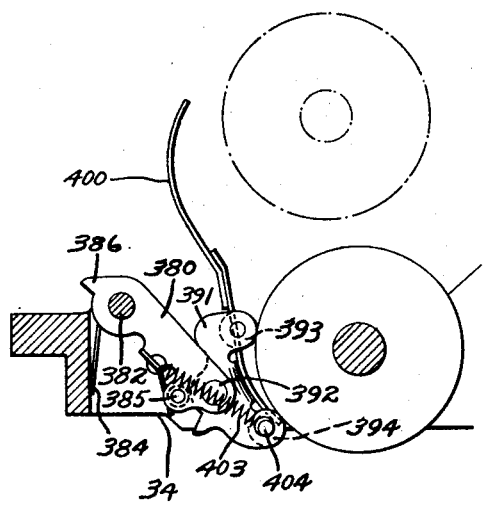
Figure 14:
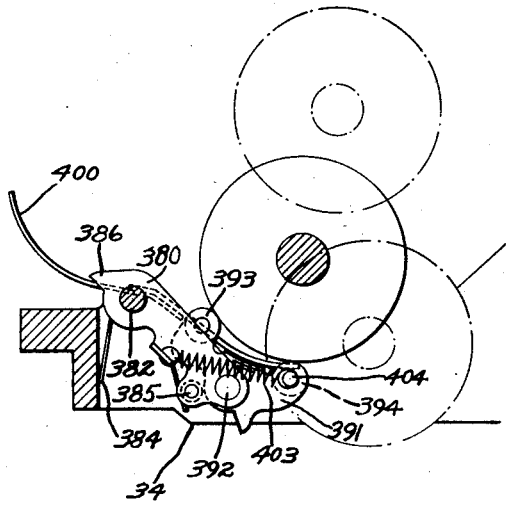
Figure 15:
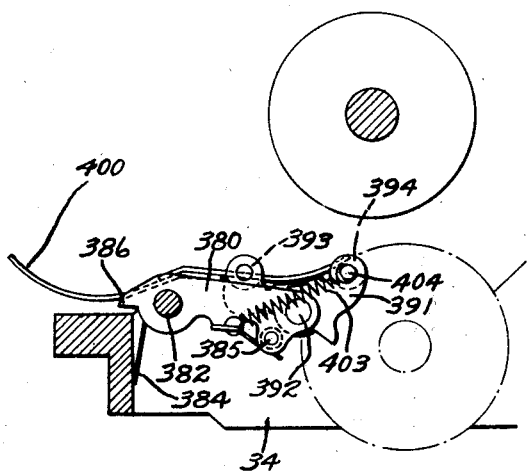
Figure 16:
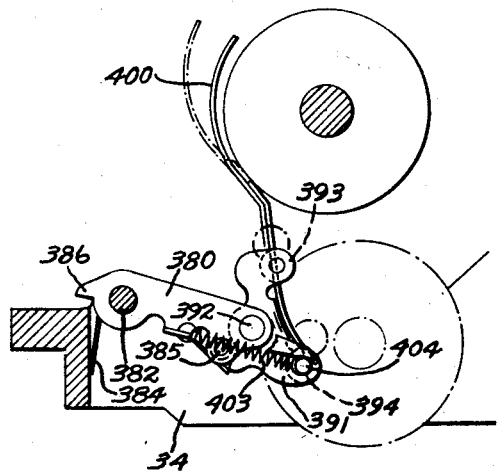

Figs. 8—A and 8—B constitute perspective views similar to Figs. 3—A and 3—B, showing certain modifications in the construction, particularly in the key control of the motor operated devices;

Fig. 9 is a perspective view of a portion of the paper carriage showing a modified form of line finder and paper table with the controls therefor;

Fig. 10 is a right end elevation of a portion of the carriage illustrated in Fig. 9, the platen being in throwback position and the combination front-feed table and line finder being in sheet receiving position;

Fig. 11 is a diagrammatic view showing the position that the platen, paper table, and line finder occupy when the platen is in throwback position with the front-feed throat open and when the combination paper table and line finder are in line-finding and sheet-holding position;

Fig. 12 is a view similar to Fig. 11 showing the position that the parts occupy as the platen starts to move toward printing position;

Fig. 13 is another view similar to Fig. 11 showing the position that the parts occupy when the platen is in printing position;

Fig. 14 is a view similar to Fig. 11 illustrating the position of the parts as the platen starts to move from printing position;

Fig. 15 is another view similar to Fig. 11 showing the position of the parts after the platen has been moved to throwback position with the paper table and line finder in sheet-receiving position;

Fig. 16 is another diagrammatic view showing the position the parts occupy when the platen is moved to throwback position with the front-feed throat remaining closed, the paper table and line finder being in sheet-holding and line-reading positions.

The invention is shown applied to a Burroughs-Moon-Hopkins type of machine whose general features are disclosed in Hopkins Patent No. 1,336,904. It is to be understood, of course, that the invention may also be applied to other types of machines.

This application is a continuation-in-part of my copending application, Serial No. 64,233, filed February 17, 1936, renewed October 18, 1938, and it also includes certain subject matter previously disclosed in my copending application Serial No.

171,879, filed October 30, 1937, now matured into Patent No. 2,192,324.

General calculating machine features

The machine, which is of the 10-key type, has a plurality of amount keys 10 (Fig. 1), which, when depressed, rock respective levers 11 counterclockwise to move thrust bars 12 upwardly to set pins 13 in a traveling pin carriage 14. During a cycle of operation of the machine, the pin carriage 14 is raised and the pins 13 that have been previously set, act to set pins 15 in a stationary field of stops which serve to arrest actuator racks 16 in positions corresponding to the amount entered in the machine.

The forward ends of the actuator racks carry types 17 that are differentially positioned as the rack bars are positioned. After the type have been positioned, a printing mechanism, including the hammer 18, is operated to print the amount of the entry.

The machine is provided with a plurality of registers, of which two are shown, a front register 20, and a rear register 21. These registers are brought into engagement with the actuator racks 16 at the appropriate times to perform addition, subtraction, and to take totals and subtotals.

Figure 1:
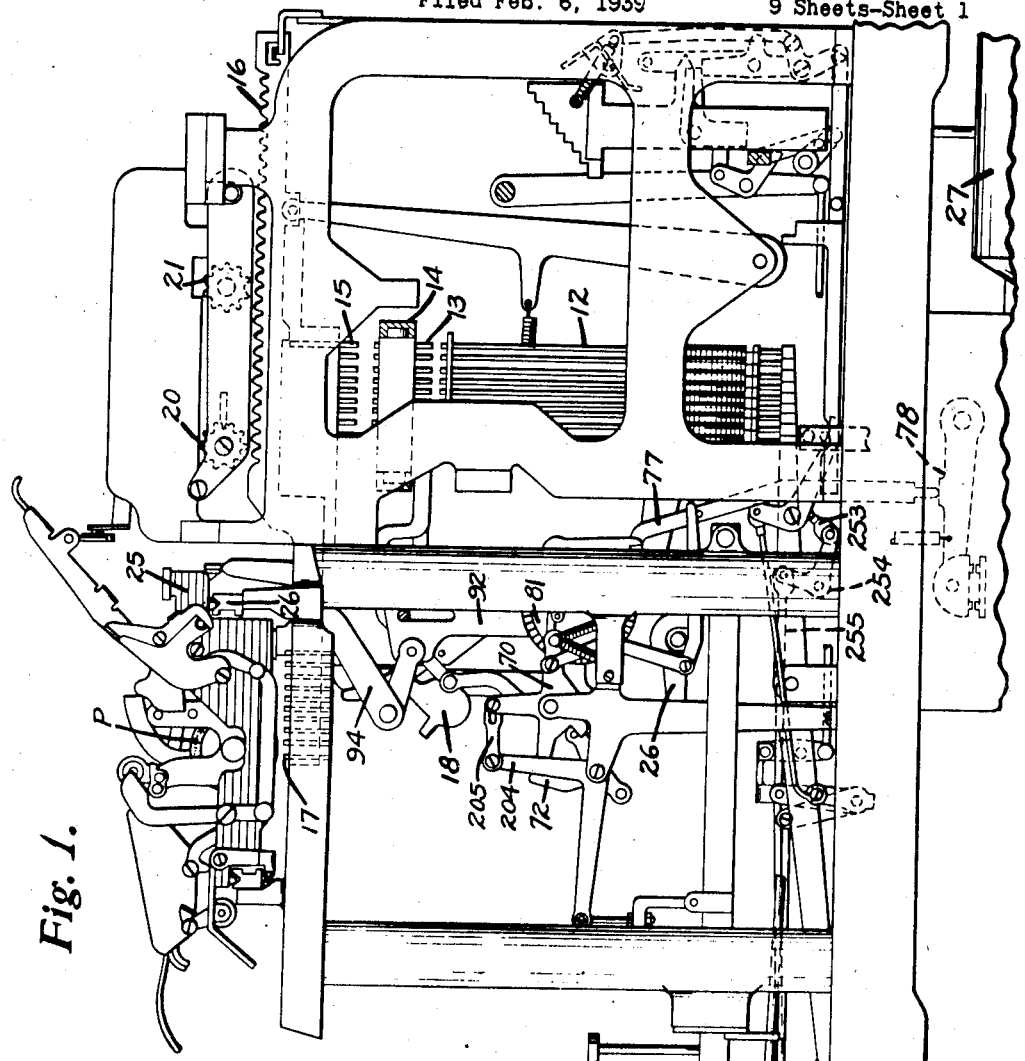
Figure 1 is a left side elevation of a machine with the invention applied thereto.

Columnar-printing control means is provided in order that printing may occur in different columns on the paper held about the platen P. In the embodiment shown, this comprises a traveling paper carriage 25 which moves across the machine from column to column under the control of a tabulating mechanism of which portions are shown at 26 (Fig. 1). The carriage normally tabulates from one column to another near the end of a cycle of machine operation in order that it may be in position for receiving the amount of the entry during the next cycle of machine operation.

The machine can be driven by hand, but is preferably operated by an electric motor 27 which is set into operation by either of two motor bars 28 and 28ª (Fig. 2) so that, upon depression of the motor bar, the motor gives the machine a single cycle of operation during which calculating functions are performed depending upon how the machine has been conditioned.

Platen mounting

The platen P normally occupies a printing position relative to the types 17 of the printing mechanism, as shown in dot-dash lines (Fig. 6). However, it may be moved to a front-feed position as shown in full lines in said figure.

For this purpose, the platen P is mounted between two end plates 30, of which one is shown in Figs. 3-A and 6. The rear sides of these plates support a cross shaft 31 (Fig. 3-A) that, in turn, is fixed to a cross plate 32. The cross plate 32 is fixed to a second cross shaft 33 pivoted in the end plates 34 of the paper carriage. When the platen-frame end plates 30 are swung clockwise about shaft 33, to the position shown in Fig. 6, the platen is raised from its printing to its front-feed position. The platen is urged to printing position by gravity and a spring.

A record sheet 37 (Fig. 6) is held about the platen by means of flexible strips such as shown in Muller Reissue Patent No. 19,001, or by any other suitable means, so that the record sheet moves with the platen as it moves from printing to front-feed position, and vice versa.

Front-feed throat

The front-feed throat which receives the work or ledger sheets is formed by a set of paper-engaging devices in the form of pressure or feed rolls 40 cooperating with the platen P (Fig. 6).

When the platen is in the front-feed position, shown in full lines in Fig. 6, the pressure rolls 40 are separated from it so that the front-feed throat between said platen and pressure rolls is open. A work sheet may then be fed over a table or chute 41 into the open throat where it is positioned by suitable collating means such as described in Muller Patent No. 2,055,552. The pressure rolls 40 are carried by a shaft 42 (Fig. 3-A) supported by levers 43, one of which is shown in Fig. 3-A, said levers being fixed to a shaft 44 pivoted in the end plates 30 of the platen frame and being urged clockwise by a spring 45 as viewed in Fig. 3-A.

The front-feed throat is closed by causing the pressure rolls and platen to return into engagement with each other, the arrangement being such that the throat is closed to grip the inserted work sheet before the platen has returned toward printing position sufficiently far to disturb the collated position of said sheet. As the platen is returned toward printing position, the inserted work sheet is wrapped about the platen by the pressure rolls 46 (Fig. 6), and the paper chute 41 is moved to inclined position, as described in Muller Reissue Patent No. 19,001, and in said Patent No. 2,055,552.

Throat opening and platen throwback

The platen is moved from printing to front-feed position by means of an electric motor which is normally inactive and which may be set into operation by hand or automatically to throw the platen back to front-feed position at predetermined times.

The platen is automatically thrown back in accordance with the column in which printing occurs. Preferably, this is the column where a total is taken because, after a total has been taken and printed on a given work sheet, it is usually the practice to remove that work sheet and insert another for the next series of operation which also will be totaled.

In the embodiment of the invention shown, the traveling paper carriage 25 is provided with a cam 50 (Fig. 3-A) positioned to engage a roller 51 on one end of a lever 52 pivoted at 53 to a stationary part of the machine. The other end of this lever is connected to a link 54 whose lower end is T-shaped and provided with two shoulders, or lateral extensions 55 and 56. The lateral extension 55 is positioned under one end of a curved abutment arm 57 slidable in a guide 58 and extending forwardly and downwardly to where it is pivoted to an arm 59 (Fig. 3-B) fixed to the shaft 60. The rear end of the abutment arm 57 is positioned adjacent a lateral lug 61 on a lever 62 which is a standard part of the machine that is rocked counterclockwise from the position of Fig. 3-A near the end of each cycle of machine operation and then returned clockwise to normal. The end of abutment arm 57 is normally below the lateral lug 61, but when a cam 50 on the carriage rocks the lever 52 to pull the link 54 upwardly, the end of arm 57 is positioned in front of said lug 61 so that, during the latter part of a cycle of machine operation, the arm 57 is moved forward to rock the arm 59 with its shaft 60 counterclockwise as viewed in Fig. 3-B. The rocking of shaft 60 starts the motor and controls a clutch for the platen throwback mechanism as follows:

The right-hand end of shaft 60 (Fig. 3—B) has a plural-armed member 70 fixed to it, which member is urged clockwise by a spring 71. When the shaft 60 is rocked counterclockwise as just explained, it is latched in its moved position by a latch 72 that engages over a lateral lug 73 on one of the arms of member 70. The rearwardly extending arm of the member 70 is connected to the upper end of a link 74 whose lower end is connected to one end of a pivoted lever 75 whose other end is positioned over a stud 76 on a link 77, which extends downwardly (Fig. 1) to a position where it controls a start and stop switch 78 (Fig. 1) for the motor 27. When the shaft 60 is rocked counterclockwise, through the parts set by the carriage and operated near the end of a cycle of machine operation, the member 70 is rocked counterclockwise, the link 74 is pulled upward, the lever 75 is rocked clockwise, and the link 77 is thrust downward to close the switch 78 to start the motor. This motor is also used to give the machine its cycles of operation, and the switch may be open or it may have remained closed when the above operation takes place. In any event, the switch is either closed or held closed, and the motor operates to throw the platen back without causing a cycle of machine operation. The motor continues to run until the platen is lowered to printing position, as will be presently described.

The motor drives a shaft 80 (Fig. 3—B) connected to which is secured a bevel gear 80ª meshing with a bevel gear 81 journaled loosely on a shaft 82, the rotation of the bevel gear 81 being counterclockwise as viewed in Fig. 3—B. Fixed to the bevel gear 81, and loosely journaled on shaft 82, is a toothed clutch member 83 (Fig. 5). A second clutch member 84 is fixed to shaft 82 and this member carries a pin 85 (Fig. 5) urged by a spring toward the teeth on clutch member 83. This pin is normally held out of engagement with said teeth by means of stud 86 controlled by a cam nose 87 on a clutch controlling arm 88 fixed to the shaft 60. This cam nose engages the stud 86 as shown in Fig. 3—B to normally hold the clutch disengaged. The clutch controlling arm 88 also has a cam nose 89, which is moved to active position when the nose 87 is moved out of active position.

The clutch is what is known as a "half-revolution" clutch; that is, when it is released, it will move a half-revolution and stop. For example, when the shaft 60 is rocked counterclockwise as viewed in Fig. 3—B, the clutch controlling arm 88 is rocked in the same direction which lifts cam nose 87 above stud 86 and puts the cam nose 89 in position for action. This releases the clutch pin 85 which then slides into engagement with clutch member 83. The clutch then rotates counterclockwise until the stud 86 engages the cam nose 89, whereupon the clutch pin 85 is moved out of engagement with the member 83. The clutch will thus be disengaged after the shaft 82 has been moved a half-revolution.

From the description thus far given, it will be evident that, when the carriage reaches a column where its cam 50 engages the roller 51 on the lever 52, mechanism will be conditioned, so that, during the latter part of the cycle of machine operation, the motor will be started and the half-revolution clutch engaged.

Fixed to rotate with the shaft 82 which is intermittently rotated by the clutch is a cam 90 (Fig. 3—B) whose edge cooperates with the stud 91 carried by a vertically movable slide 92. The upper end of this slide (Fig. 3—A) is connected by a stud and slot connection 93 with one arm of a bell crank yoke 94 pivoted at 95. The cross piece of this yoke carries rollers 96 and 97, one of which is rotatable about a horizontal axis and the other about a substantially vertical, but slightly inclined, axis. These two rollers are adapted to bear against the lower rear side of the cross plate 32 on the platen frame.

When the clutch gives the shaft 82 a half-revolution from the position of Fig. 3—B, the high point of cam 90 moves under the stud 91 and raises the slide 92. This rocks bell crank yoke 94 counterclockwise, as viewed in Fig. 3—A, and pushes forward on the lower edge of plate 32. If nothing were provided to prevent it, this would cause the platen frame to move forwardly to a different case-shift position, as will be described later, but, at this time, the frame is prevented from moving forward by mechanism as follows:

Fixed to a square stationary cross shaft 100 on the paper carriage is a bracket 101 upon which is pivoted a bell crank lever having a horizontal arm 102 and a downwardly extending arm 103, the bell crank being urged counterclockwise, as viewed in Fig. 3—A, by a spring 104. This bell crank has an L-shaped slot 105 in which a stud 106 operates, the stud being carried by an extension on the platen-frame end plate 30. The bell crank 102—103 is normally held in the position of Fig. 3—A by means of a lug on the rear end of a slide 107 that is urged to the left, or forward as viewed in Fig. 3—A, by a spring 108. The latter spring is stronger than the spring 104 so that it will hold the bell crank in the position of Fig. 3—A against the tension of the latter, where, it will be observed, the stud 106 is in the vertical portion of the L-shaped slot 105.

With the parts in this position, the platen frame cannot move forward and the pressure applied by the rollers 96 and 97 on the cross piece 32, which pressure is below the axis of shaft 33, causes the platen frame to rock about said axis to throw the platen from printing to the front-feed position shown in Fig. 6. The platen is held in this position by reason of the fact that the high point of the cam 90 is, at the time, under the stud 91, where it remains to hold the platen in throw-back or front-feed position.

Thus, when the carriage reaches a position where the carriage cam 50 becomes active, the electric motor is automatically started, the half-revolution clutch is thrown in, and the platen is automatically thrown to front-feed position and the front-feed throat opened without causing a cycle of machine operation. The manner in which the front-feed throat is opened will now be explained in more detail.

*Automatically opening front-feed throat*

The front-feed throat is normally opened automatically at the time that the platen is moved to front-feed position, in order that the work sheet already in the machine may be removed and another one quickly inserted.

As explained, the pressure rolls 40, forming a part of the front-feed throat, are carried by a shaft 42, which, in turn, is supported by arms 43 fixed to a rock shaft 44. The upper end of the arm 43 shown in Fig. 3—A has a curved extension provided with an abutment end 110 adapted to engage a stud 111 on arm 112 pivoted on the bracket 101. The stud 111 is controlled with reference to the path of the end 110 of arm 43, but, for the present description, the stud will be considered to be in the path of the arm.

As the platen is moved to front-feed position, the pressure rolls move with it and the arm 43, with its abutment end 110, moves clockwise about the axis of shaft 33 as a center. Shortly before the platen reaches its front-feed position, the abutment end 110 of arm 43 engages the stud 111 which blocks further movement of the pressure roll shaft, whereupon the platen moves away from the pressure rolls to open the front-feed throat.

Thus, considering the control of the front-feed throat, when the carriage reaches a position where the carriage cam 50 becomes active, the electric motor is started, the half-revolution clutch is thrown in, and the front-feed throat is automatically opened by the power of the motor which acts directly for this purpose.

The front-feed throat is preferably opened after a total-taking operation and the carriage cam 50 is preferably placed so as to become active in the total-taking column. Near the end of the total-taking cycle, the motor is started, as above explained, and the throat automatically opened. The total is usually taken with the carriage in its left-hand position, viewing the machine from the front. After the total-taking operation, the carriage is usually automatically returned to the right so that it will be in position for the next series of entries. During the return of the carriage to the right, the front-feed throat remains open so that the operator can remove one work sheet and insert another while the carriage is traveling across the machine. The cam 50 can, of course, be located in any desired position to vary the control of the throat opening.

During this time, the electric motor is running, because the shaft 60 is latched in position to keep the motor starting switch closed, but, since the clutch 83—84 is opened, the mechanism controlling the front-feed throat is not operated again, and the motor simply runs idly.

It is to be observed that the throat is not opened by an operation of the operating mechanism of the machine during a cycle of machine operation. On the contrary, near the end of a cycle of the machine, the lever 62 (Fig. 3—A) is operated, which causes the motor to start, throws in the clutch, and causes the motor to open the front-feed throat by a direct drive that operates independent of the cycling operation of the machine.

*Automatic closing of front-feed throat*

After a new work sheet has been inserted in the front-feed throat, it is necessary that the same be closed before printing operations occur, and, in the present invention, this occurs automatically without requiring any attention on the part of the operator.

Referring to Fig. 1, the amount keys 10, when depressed, rock their levers 11; which thrust the bars 12 upwardly as heretofore explained. Levers 11 also move an escapement bar 120 (Fig. 3—B) upwardly to cause the pin carriage 14 (Fig. 1) to move over a space after each key depression. The escapement bar is moved upwardly each time an amount key is depressed, and thus moves upward upon the depression of the first amount key that is depressed for the entry of an item with the front-feed throat open.

The bar 120 carries a stud 121 positioned under the laterally bent end 122 of one arm of a pivoted bell crank yoke 123 whose other arm 124 is connected to the latch 72 that holds the shaft 60 in the position to which it was moved to cause the motor to open the throat. The arrangement is such that, upon the depression of the first amount key, no matter which key it may be, the latch 72 is released, whereupon the shaft 60 is rocked clockwise from the position of Fig. 3—B by the spring 71. This will move the clutch controlling arm 88 clockwise which moves the cam nose 89 below the stud 86 which, at the time, is 180° from the position of Fig. 3—B. The cam nose 87 is, at the same time, moved to active position. The clutch member 84 is thus released and it moves into engagement with clutch member 83. The clutch moves through a half revolution, that is, it moves until stud 86 carries around to a point where it engages cam nose 87 which disengages clutch member 84 from member 83. It will be recalled that the motor is running at the time because shaft 60 was latched in position when the throat was opened, and the switch is thus closed when the amount key is depressed. The rocking of shaft 60 in a clockwise direction opens the motor switch but the momentum of the motor will rotate the clutch through a half revolution, this action resulting in certain advantages explained later. The rotation of the clutch, with shaft 82 and cam 90, through a half revolution, brings the low part of the cam 90 under the stud 91, with the result that the slide 92 is lowered, the same being urged downward by the platen frame which, as previously explained, is urged toward its printing position. The downward movement of slide 92 enables the bell crank yoke 94 to move downward and permits the platen to lower toward printing position. As the platen moves toward printing position, it moves toward the pressure rolls 40 forming a part of the front-feed throat. The throat is closed to grip the papers and the pressure rolls then move with the platen as the latter moves to printing position. Thus the front-feed throat is first closed and then the platen is moved to printing position, the arrangement being such that the papers are gripped before they are disturbed by the movement of the platen.

As mentioned, when the shaft 60 is rocked clockwise, the motor control switch is opened. At this time the motor is running and, while the opening of the switch cuts off the energy supply to the motor, the motor and its connections have sufficient momentum to move the clutch and associated parts, the platen moving back to normal under the urge of gravity and a spring, not shown. The motor and its connections act as a governing means, as will now be explained.

*Governing action of electric motor*

One of the important advantages of the invention is that the electric motor and its connections are such that they act as a governing means to regulate the speed and uniformity of movement of the parts in much the same manner as a dashpot is ordinarily used on a calculating machine. At the same time the motor and its connections, by their momentum, move sufficiently to cause the machine parts to be eased to final position.

Referring to Fig. 3—B, the cam 90 is so shaped that, as the motor moves it, the link 92 follows it and thus moves down gradually and in a uniform manner. The inertia of the connections and of the motor armature, as well as the friction of the parts, are such as to prevent the parts from moving too fast. Their speed is thus governed and their movement is made uniform. At the same time, the momentum of the armature and the connecting parts is such that the mechanism will be moved to final position. The result is that the platen is moved to printing position and the front-feed throat closed in a controlled and uniform manner, and without the noise and jar that usually occurs when a motor is employed to drive the parts to a final position where they are suddenly stopped.

The action of the motor and its connections depends, in part, upon the point in the cycle of operation at which the motor switch is opened. In the construction so far described, when the shaft 60 is rocked clockwise, the motor switch is opened immediately. This has been found satisfactory when the motor is warm and the parts have been operated for some time. When the motor is cold and under conditions where the oil on the parts may be stiff, the parts may be retarded too quickly, or at least retarded too much so that the platen will not reach its final printing position. In order to insure that the parts will operate properly under all conditions, an added control has been provided which is adjustable so that the retarding action above described can be easily regulated.

Referring to Fig. 4, a disk 130 is fixed to the clutch member 84. This disk has a small notch 131 in its periphery which is in the upper position shown in Fig. 4 when the platen is in printing position. The notch 131 receives a stud 132 on an arm 133 (Fig. 3—B) of a yoke 134 pivoted freely on shaft 60. This yoke has another arm 135 extending rearwardly at the right side of the machine and a spring 136 serves to urge the yoke in a clockwise direction to cause the stud 132 to follow the periphery of the disk 130 at all times. The arm 135 engages a stud on a bell crank latch 137 pivoted to the machine frame and urged by a spring 138 in a clockwise direction to bring a notch 139 on its lower arm into engagement with a horizontal portion of member 77, the latter being a portion of the means for opening and closing the motor switch both for machine operations as well as for operations in moving the platen and opening the front-feed throat. When the member 77 is moved downwardly, the motor switch is closed to cause the motor to operate, whereas upward movement of member 77 opens the switch to stop the motor.

When the clutch member 84 is in normal position, then platen is in printing position, and the front-feed throat closed, the stud 132 occupies the notch 131 in disk 130 as shown in Fig. 4. This allows yoke 134 to be retained in its clockwise position with the shoulder 139 of latch 137 out of engagement with member 77. The latch is thus normally held inactive so that it will not retain the motor in running condition after the machine has been operated.

When the front-feed throat is opened and the platen is moved to front-feed position, the clutch member 84 rotates one-half revolution and the disk 130 travels a like distance. This cams the stud 132 out of notch 131 and rocks yoke 134 to release the latch 137. It also brings a large notch 140 to the rear of stud 132 as indicated in dot-and-dash lines in Fig. 4. In this position of disk 130, the stud 132 will rest on the outside periphery of the disk and the latch 137 will be free to engage the member 77 controlling the motor switch. It will be recalled that, while the front-feed throat is being opened and the platen raised, and while the parts are retained in this position, the motor is kept running because the latch 72 (Fig. 3—B) is engaged with the lug 73, thereby retaining the four-arm member 70 in its counterclockwise position, the latter serving to hold member 77 downward against the stud 76. However, upon depression of the first digit key, the latch 72 is released, which allows the four-arm lever 70 to restore clockwise, thereby rocking shaft 60 and conditioning the parts to cause the front-feed throat to be closed and the platen lowered to printing position. As described earlier in the specification the motor switch is opened when the shaft 60 is moved. But, with the mechanism just described, at the instant that the four-arm member 70 is released, instead of the motor switch being opened, the latch 137 acts to retain the switch member 77 in lowered position, thereby causing the motor to continue to run. Then, as the clutch member 84 starts its one-half revolution of return movement to close the front-feed throat and lower the platen, the large notch 140 of disk 130 moves under the stud 132 and the stud drops into the notch, whereupon the yoke 135 is rocked clockwise (Figure 3—B) to release latch 137 and member 77, thereby allowing the motor switch to open. The momentum of the motor is then relied upon to move the parts to final position, and the inertia of the parts is used to govern or regulate the movement.

Since these machines often have carriages of different widths and since the individual parts on some of the machines may vary slightly from those on others, a control of the motor release is provided in order that action of the motor can be easily adjusted. This adjustment is obtained by means of a plate 142 (Fig. 4) whose position on disk 130 can be changed by the use of an adjusting screw 143. This plate has an outer edge that corresponds to the periphery of the disk 130. By locating this plate to the desired position, the time at which the stud 132 is allowed to drop into the large notch 140 can be closely regulated to obtain the desired timing of the opening of the motor switch.

While this use of the motor for governing the movement of parts during their return has been shown for governing the control of the closing of a front-feed throat and the movement of a platen to printing position, it can also be employed for governing other parts of a calculating or similar machine and can thus act like a dashpot, or air cushion, or retarding device for insuring a uniform action of the mechanism, for governing the speed of movement of the mechanism, and for cushioning the movement of the parts to final position.

*Automatic line spacing*

It is desirable to line-space the record sheet between each series of entries on the different work sheets, and provision is made in the present machine for automatically accomplishing this. Usually each series of entries is made on the same line after which a total is printed on this same line and then the record sheet is line spaced. In other words, the line spacing should occur after each totaling operation.

The link 54 that is raised by the lever 52 controlled by the paper carriage has a lateral lug 150 (Fig. 3—A) which is positioned under one arm of a bell crank lever 151 pivoted at 152. The other arm of this bell crank lever is positioned in front of a stud 153 on a lever 154 pivoted on a stud 155 on a slide 156.

The upper end of the lever 154 forms an abutment which, when the bell crank 151 is rocked counterclockwise by the raising of link 54, is moved under a stud 157 that during a cycle of machine operation, is moved downwardly from the full to the dot-dash position of Fig. 3—A and then returned upwardly, said stud being a standard part of the machine. The slide 156 is connected at its upper end to one end of an arm 160 pivoted at 161. Intermediate its ends the arm 160 is provided with a lateral lug 162 and a roller stud 163 which straddles a bail 164 carried by arms 165 pivoted on studs 166 on the main carriage frame. The free end of the right-hand arm 165 (Fig. 3—A) carries a line space pawl 167, that operates on a ratchet wheel 168 on the platen P.

With this arrangement, when the carriage reaches a column where the cam 50 becomes active, the link 54 is raised, the bell crank 151 is rocked, and the lever 154 is moved so that its abutment end is under the stud 157. Then, during the latter part of the cycle of machine operation, the slide 156 is moved downwardly which pulls the bail 164 downward and moves the line space pawl 167 upwardly. During the return stroke the parts are returned to normal, the line space pawl being moved downwardly by a spring 169 to cause a line space movement of the platen.

It is to be observed that this automatic line space operation takes place as an incident to a cycle of machine operation and is not dependent upon the motor driven clutch heretofore described for operating the front-feed means. The latter does not operate until after the line spacing operation has occurred.

*Front-feed throat control*

In the prior description of the opening of the front-feed throat it was assumed that the stud 111 (Fig. 3—A) was in the path of the end 110 of the arm 43 connected to the shaft 42 carrying the rollers 40 that form a part of the front-feed throat. Said stud is not normally in said position but it is automatically moved to such position by mechanism associated with the line spacing controls just described.

The link 54, which is moved upwardly by the lever 52 under the control of the paper carriage, has, as previously mentioned, a lateral lug 56. This is positioned under the edge of an abutment arm 170 pivoted to a second arm 171, which, in turn, is pivoted on a stud 172. The rear end of the abutment arm 170 is adapted to be engaged by the lateral lug 61 on the lever 62 which, it will be recalled, is rocked counterclockwise as viewed in Fig. 3—A at the end of a cycle of machine operation. The arm 171 carries a stud 173 positioned behind an arm 174 pivoted on one arm of a yoke 175 (Fig. 3—B) journaled loosely on the shaft 60. The arm 174 has a notch 176 (Fig. 3—A) in it adapted to engage over the stud 155 on the slide 156. The yoke 175 has another arm carrying a stud 177 (Fig. 3—B) positioned in the path of a cam 178 on the shaft 82.

When the link 54 is raised under the control of the paper carriage, as heretofore described, the abutment arm 170 is moved so that its end is in front of the lateral lug 61 on lever 62. Near the end of the cycle of machine operation, and after the line spacing operation just described during which slide 156 is moved downward and then returned upwardly, the arm 170 is pushed forward, which moves the notched arm 174 forward so that its notch moves over the stud 155. The arm 170 is latched in its forward position by the engagement of a notch 179 in the arm with the lug 56 on member 54. At the time the abutment arm 170 is moved forward, the abutment arm 57 is also moved forward and it will be recalled that the latter starts the motor and throws in the clutch for raising the platen. The clutch rotates the shaft 82 counterclockwise a half revolution (Fig. 3—B) and the latter, in turn, rotates the cam 178 a half revolution. The cam engages the stud 177 and rocks the yoke 175 clockwise which pulls arm 174, and the slide 156 to which the arm is connected, downwardly. The slide 156 rocks arm 160 and pulls the bail 164 downward. If the platen had remained in printing position, another line space operation would have taken place, but, in the meantime, the platen has been moved out of printing position so that the line space mechanism becomes ineffective, the ratchet 148 having moved away from pawl 167.

The left-hand arm 165 carrying the bail 164, which is pivoted at 166, carries a stud 180 positioned under the 112 arm carrying the stud 111. When the bail 164 is pulled downward as just explained, the stud 180 swings arm 112 upward and the stud 111 is then raised so that it is in the path of the abutment end 110 of the arm 43. The result is that, as the platen moves towards printing position, the end of the arm 43 engages the stud 111 and further movement of the pressure rolls forming a portion of the front-feed throat is prevented. The platen then moves away from the pressure rolls and the front-feed throat is opened as heretofore explained.

*Moving the platen to front-feed position without opening front-feed throat*

In the machine disclosed, it is necessary to raise the platen in order for the operator to inspect an entry that has been made. It is desirable, at times, to move the platen back to read an entry without opening the front-feed throat. Provision is made for doing this automatically, or under the control of a key.

For automatic control, the paper carriage is provided with a cam 190 which is slightly smaller than the cam 50, with the result that when the carriage reaches a column where the cam 190 is active, the lever 52 will be rocked, but it will not be rocked as far as when acted upon by the cam 50. The parts are proportioned so that this will raise the link 54 a distance sufficient to raise the rear end of the abutment arm 57 in front of the lug 61 but not sufficient to raise the rear end of abutment arm 170 in front of said lug. The result is that, when the lug 61 is moved forwardly near the end of a cycle of machine operation, the arm 57 is moved forward to start the motor, throw in the clutch, and cause the platen to be moved from printing to front-feed position. But, because the abutment arm 170 is not moved forward, the notched arm 174 is not hooked over the stud 155 and the slide 156 will not be pulled downwardly. Thus the bail 164 will not be moved and the stud 111, which blocks movement of the end 110 of the lever 43 connected to the shaft 42 carrying the pressure rolls 40 of the front-feed throat, will not be positioned in the path of said end 110. The result is that the front-feed throat will not be opened as the platen is moved to front-feed position.

Thus, the platen can be automatically thrown back to front-feed position in a predetermined column, while the front-feed throat remains closed, which enables the operator to read the entry without having the papers released. This position will be called the "reading position" of the platen and front-feed means. In the embodiment of the invention illustrated, this position of the platen is the same as the "front-feed" position to which the platen is moved when the throat is opened. In one case the throat is closed and in the other it is open, but the platen is in its "front-feed" position in both cases. The terms "out of printing" position, and "throwback" position, are broad terms including both the so-called "front-feed" and "reading" positions.

If the operator desires to look at an entry in some column where the paper carriage does not throw the platen back automatically he may do so by manipulating a key control which operates as follows:

Referring to Fig. 3—B, a key 200 is connected by a link 201, to an arm 202 of a three-armed lever pivoted at 203. The upper arm 204 of this lever is connected by a link 205 to an extension of the member 70 fixed to shaft 60. Thus, when the key 200 is depressed, the three-armed lever is rocked counterclockwise which rocks member 70 and shaft 60 counterclockwise. This starts the motor and throws in the clutch to cause the platen to be thrown back. At this time, the carriage has not lifted link 54 and abutment arm 170 so that the notched arm 174 is not hooked into stud 155. Accordingly, when the platen is thrown back, the front-feed throat will not be opened. When the shaft 60 is moved as above described, it is latched in the position to which it is moved by means of the latch 72 heretofore explained.

A novel and convenient feature of the present construction is that the operator may return the platen to printing position by a second depression of the same key 200. The member 70 has a V-shaped nose 210 with which a roller stud 211 on a pivoted bell crank lever 212 cooperates. This bell crank lever is carried by the rearwardly extending arm 213 of the three-armed member 202—204—213, and it is urged to the position of Fig. 3—B by the spring 214. The first time the key 200 is depressed the roller stud 211 rides on the rear edge of the V-shaped nose 210 and the movement is an idle one. At the time the second depression of the key 200 occurs, the nose 210 has been moved rearwardly, by reason of the member 70 having been rocked counterclockwise. When the key 200 is depressed a second time, the three-armed lever 202—204—213 is rocked counterclockwise, at which time the stud 211 moves over the forward edge of the nose 210. This moves the stud in a path such that it engages the lower edge of an arm 215 connected to the latch 72, the stud being long enough for this purpose. This releases the latch 72 and, when the latch is released, the member 70 is returned clockwise by its spring 71 which rocks the shaft 60 to cause the clutch 83—84 to go through another half revolution to lower the platen from front-feed to printing position.

In this manner the operator can very quickly have the platen thrown back to reading position by power and as quickly returned, the control being by the same key.

Automatically holding free ends of work sheets when platen raised to read entries When the platen is moved out of printing position to enable the operator to read an entry, the free ends of the work sheet, or sheets, unless otherwise prevented, tend to fall forward. Automatic means has been provided for holding the free end of the work sheet in position when the platen is thrown back for the purpose of enabling the operator to read entries, said holding means being automatically disabled when the platen is moved back and the front-feed throat opened.

Referring to Fig. 3—A, there is pivoted on a shaft 220, carried by the movable platen frame, a finger 221 normally occupying the position of Fig. 3—A where it is at the side of the work sheet. This finger has a tail piece 222 with which cooperates a cam arm 223 fixed to a shaft 224. There is a second finger at the left-hand side of the machine, as viewed from the front, and a second cam arm on the shaft 224, said second set of parts operating at the same time as the first except that the left-hand finger is swung counterclockwise while the first finger 221 is swung clockwise. Fixed to the shaft 224 is a crank arm 225 carrying a stud 226 cooperating with a cam surface 227 on a lever 228 pivoted at 229 on the main carriage frame. The lower end of this lever is connected by a link 230 to a bell crank 231 pivoted at 232 on the main carriage frame and having an abutment surface cooperating with the stud 233 on the arm 165 which is moved when the bail 164 is moved.

Assuming that the parts are in the position of Fig. 3—A, if the platen is thrown back the shafts 220 and 224 swing back with it and the stud 226, riding on the cam surface 227, rocks the shaft 224 counterclockwise, which swings the fingers 221 to substantially horizontal position in front of the work sheet. Thus, as the platen is moved upwardly, the free end of the work sheet is held by the fingers to prevent it from falling forward. A latching means is provided for retaining fingers 221 in position until the platen is returned to printing position, said latching means and its release being disclosed in detail in Reissue Patent No. 19,001. The cam surface 227 of the lever 228 is active under the conditions above explained because this cam surface is held rigidly in position by the link 230 and the bell crank 231 which abuts against the stud 233. The stud 233 remains in the position shown in Fig. 3—A during the raising of the platen for reading purposes because, during such action, the bail 164 is not rocked, it being recalled that this bail is rocked only when the link 54 is raised to its higher position, which does not occur when the machine is conditioned to throw the platen back to read an entry without opening the front-feed throat.

When the platen is moved back to front-feed position and the front-feed throat opened, the above fingers 221 do not operate because, at that time, the bail 164 is pulled downwardly which raises the stud 233 away from the abutment end of the bell crank 231. The result is that the cam 227 is not held rigidly in position and will not act to swing the crank 225 and shaft 224 as heretofore explained. Thus the finger moving means is automatically disabled at the time the front-feed throat is opened.

Control by total-taking control means

A modification of the invention is shown in Fig. 7 in which the throwback of the platen and the opening of the front-feed throat are controlled so that the throat opens only after a total-taking operation.

Figure 2:
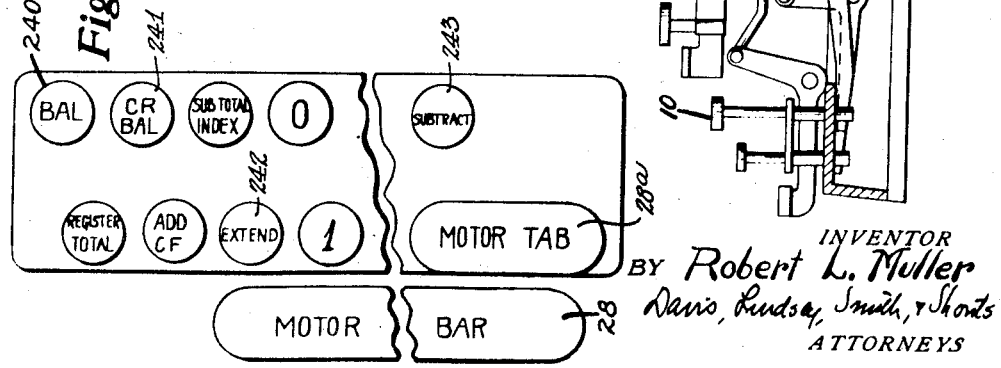
Fig. 2 is a partial plan view of a portion of the keyboard of the machine of Fig. 1.

The machine is provided with total-taking control means of well-known construction which, when the total key 240 ("Bal" Fig. 2) is depressed, operates to condition the machine to enable a total to be taken by a single cycle of machine operation. When the total is negative, the machine must be put through three cycles, and this may be done under the control of certain keys that are manipulated by hand, as described in Hopkins No. 1,206,113, and Mueller No. 1,715,170, or the entire three cycles may be caused to take place automatically upon depression of a credit balance key 241 (Cr. Bal.) (Fig. 2). When the negative total operations are controlled manually, the "extend" key 242 shown in Fig. 2 is depressed and the machine given a cycle of operation. The "subtract" key 243 is depressed and the machine given another cycle of operation. Finally, the total key 240 is depressed and the machine given a third cycle. When the three cycles are controlled automatically, only the credit balance key 241 is depressed. The latter controls certain mechanism, later described, which causes the three cycles of machine operation to take place automatically and the machine to be automatically conditioned for each cycle. The true negative total is printed during the third or last of these three automatic cycles. In the taking of a negative total, it is not desired to have the front-feed throat opened during the first two cycles but it should open after the total is printed during the third cycle. The present invention takes care of this condition as follows:

Referring to Fig. 7, the connection between the lever 52 and link 54 is made in the form of a stud and slot connection which allows a limited relative movement between the parts, the parts being connected by a spring 250. When the paper carriage arrives at the total-taking column it rocks the lever 52, but the link 54 is prevented from moving by means of a latch 251. Thus, while the paper carriage tends to condition the parts, it does not actually condition them but tensions the spring 250. When the total key 240 is depressed, it rocks the latch 251 by means of a releasing lever 252. The latter is connected by a link 253 (Fig. 1) to a bell crank 254 which, in turn, is connected by a rod 255 to the "Bal" or total key. Depression of the total key thus releases link 54 which moves upwardly and conditions the parts as heretofore described so that, during the latter part of the cycle of machine operation, the motor switch is closed and the front-feed throat automatically opened. The platen is, of course, also moved to front-feed position.

Accordingly, in the total-taking column of the machine, the front-feed throat will be automatically opened after a total is taken. While the carriage ordinarily moves to another position after a total is taken, it can be retained in the total-taking column by depressing the "non-tab" motor bar 28 (Fig. 2). In that event, with the carriage stationary, items may be entered in the machine and the machine cycled but the throat will not be automatically opened until a total is taken.

Since the total key controls the function of total taking, it will be referred to as a "function control key" in some of the claims.

*Power operated case shift mechanism*

The platen is moved from one case shift position to the other by moving it horizontally. The normal position of the platen is that shown in Fig. 3—A. In order to move it to the capital letter case shift position the platen is moved forwardly.

For the purpose of moving the platen, a case shift key 280 (Fig. 3—B) is provided which is connected through a link 281 to an arm 282 loosely mounted on the shaft 60. This arm is positioned over stud 283 on an arm 284 fixed to the shaft 60 so that, when the arm 282 is rocked by depression of the case shift key, the shaft 60 is rocked counterclockwise to start the motor and throw in the clutch heretofore described.

The arm 282 also has a lug 285 extending over the edge of an arm of a yoke 286 pivoted loosely on the shaft 60. This yoke has a downwardly extending projection 287 provided with a bifurcated end in which is positioned an arm 288 of a bell crank lever pivoted at 289 and urged counterclockwise as viewed in Fig. 3—B by a spring 290. The other arm of the bell crank lever has a stud 291 operating in a groove in a sleeve 292 slidable on shaft 82 and attached to cam 90. The latter has an opening in it through which projects a pin 293 on a cam 294 fixed to shaft 82. Cam 90 receives its rotative movement through pin 293 which is moved by cam 294 fixed to shaft 82. The cam 294 is adapted to operate against the stud 91 but, as long as cam 90 is active, cam 294 has no effect because it is smaller than 90.

When the case shift key 280 is depressed, the arm 282 rocks the yoke 286 counterclockwise, which rocks the bell crank 288 clockwise and shifts the cam 90 laterally to the right a distance sufficient to move it out of the path of the stud 91. The result is that, when the clutch 83—84 gives the shaft 82 and sleeve 292 a half revolution, the cam 294 acts on the stud 91 to raise the slide 92, but the slide is not raised as high as when the cam 90 acts.

When the slide 92 is raised the shorter distance, the bell crank yoke 94 is rocked to push forward on the plate 32 as heretofore explained. If the platen frame were blocked against sliding movement, as previously described, the platen would be tilted back toward front-feed position, but the depression of the case shift key unlatches the platen frame as follows:

The yoke 286 (Fig. 3—B) has an upwardly extending arm 300 pivoted to the end of a lever 301 whose upper end is connected by a link 302 to a pivoted arm 303. This arm carries a stud 304 engaging a bail 305 pivoted at 306 and extending across the paper carriage. This bail is connected at its left-hand end to the slide 107.

When the case shift key is depressed, the yoke 286 is rocked counterclockwise, which rocks lever 301 clockwise and pulls the bail 305 to the rear. This moves the slide 107 rearwardly and the lug on its rear end releases the bell crank latch 102—103 which is thereupon rocked counterclockwise by its spring 104. This moves the horizontal portion of the L-shaped slot 105 into line with the stud 106 on the platen frame, so that, when pressure is applied to the plate 32 by the bell crank yoke 94, the platen frame is slid forwardly instead of being rocked and the platen is moved to a new case shift position instead of being thrown back to front-feed position.

When the case shift key is released, it moves upward to normal position which allows the shaft 60 to restore to normal and causes the clutch to give the shaft 82 and sleeve 202 another half revolution. This rotates cam 204 a half revolution and restores the slide 92 to normal. Also, the cam 90 is restored laterally to the position of Fig. 3—B and the slide 107 is allowed to return to normal, its spring 108 overcoming spring 104. The platen returns to its normal case shift position under the urge of a spring.

When the case shift key is depressed, the latch 72 at the right-hand end of shaft 60 does not latch the shaft in position because the case shift key does not move the shaft 60 counterclockwise as far as it is moved by the other mechanisms heretofore described, and not far enough to enable the latch to act.

Modified automatic control

Figures 8—A and 8—B illustrate a modified form of automatic control which is constructed and arranged as follows:

The carriage controlled lever 52 (Fig. 8—A) has a stud 310 on its end instead of the cam roller illustrated in Fig. 3—A. Mounted on the carriage is a control shaft 311 on which the cams or tappets for operating the lever 52 are mounted. The one to the right in Fig. 8—A comprises a body 312 adjustably mounted on shaft 311 and supporting a pass-by pawl 313 adapted to engage the stud 310 in predetermined positions of the paper carriage. The pass-by pawl 313 acts on a stud 310 when the carriage is moving in tabulating direction but passes over this stud during return of the carriage.

The lever 52 may be also rocked during the return of the carriage and for this purpose a cam support 314 is adjustably mounted on the shaft 311, said support carrying a pass-by pawl 315 adapted to act on the stud 310 during the return of the carriage but passing over said stud when the carriage is moving in tabulating direction.

The cam supports 312 and 314 may be adjusted on the shaft 311 so that their pawls will act on the stud 310 in almost any desired position relative to the stationary position toward which the paper carriage may be moving. For example, the pawl 313 may act on said stud while the carriage is moving between columns in tabulating direction or it may be positioned so as to act just before the carriage reaches a stationary position in the column to which the carriage is moving in which event the operation of the mechanism for opening the front-feed throat will take place with the carriage in stationary position in said column because the carriage reaches said position before the mechanism has an opportunity to operate.

Although it is shown otherwise in Fig. 8—A, the support 314 for the pass-by pawl 315 is preferably located to cause the pawl to operate just as the carriage starts to return so that the front-feed throat will be open during the major portion of the return movement of the carriage thereby enabling the operator to remove a sheet while the carriage is returning to its right-hand position.

The carriage control lever 52 is connected to a link 54 as in the first described construction. This link is urged downwardly by spring 316 connected to a lateral lug 317 on the lower end of the link. The lug 317 is positioned under a shoulder on a pawl 318 pivoted on a member 319, the pawl 318 being urged clockwise as viewed in Fig. 8—A by spring 320 against a limit stud which prevents pawl 318 from interfering with the movements of link 54. The member 319 is urged forwardly by a spring 321 but is normally prevented from moving forward by a lug 322 on said member which engages behind the edge of a stationary plate 323. The front end of a member 319 is connected to the upper arm of a bell crank 324 pivoted on the shaft 60 that controls the motor switch and the clutch heretofore explained. The rear end of member 319 is urged downward into contact with the plate 323 by a spring 325.

From the above it will be clear that when the lever 52 is rocked clockwise by one of the carriage cam-pawls 313 or 315 the link 54 will be raised which will raise the rear end of the member 319 so as to free it to be moved forward by the spring 321. When the member 321 moves forward, it rocks the arm 324 counterclockwise and said arm engages a lug on an arm 324ª that is fixed to the shaft 60. This rocks the shaft 60 in a direction to start the motor and engage the clutch for moving said shaft 82 (Fig. 8—B) counterclockwise through a half revolution. It is to be noted that the carriage may thus start the motor to operate shaft 82 without any regard to the cycling of the machine. For example, the paper carriage may be moved by hand to a position to cause one of the cam-pawls 313 or 315 to act, in which event the motor will be started and the clutch engaged to operate the parts driven by the shaft 82. When the parts are conditioned by movement of the carriage in tabulating or return direction, the motor is started and the shaft 82 is moved through a half revolution without causing a cycle of machine operation although the control of the parts is initiated by the paper carriage that is moved as an incident to the machine cycle.

When the shaft 82 is given a half revolution, the link 92 (Fig. 8—A) is moved upwardly which rocks yoke 94 to move the platen to throwback position as hereinbefore explained.

When it is desired that the front-feed throat be opened at the time the platen is thrown back, it is necessary that the stud 111 (Fig. 8—A) be moved into the path of the abutment end 110 of the lever 43 as heretofore explained, said stud 111 normally being out of the path of said abutment. For this purpose a lever 326 is provided which is pivoted at 327 to a stationary part of the machine, said lever being urged counterclockwise in Fig. 8—A by a spring 328, the upper end of the lever having a lug limiting against a stationary part of the machine. Pivoted to the lower end of this lever at 329 is a second lever 330 having on its rear end a lateral lug 331 adapted to be engaged by a shoulder on the member 319. The lever 330 is urged upward by a spring 332 which tends to keep the lug 331 in front of the shoulder on member 319. The lower end of the lever 326 has a lateral lug 326ª on it which is positioned in front of a pawl 333 which corresponds to the pawl 174 in Fig. 3—A.

When the member 319 is moved forward its shoulder engages the lateral lug 331 and moves the lever 330 forwardly which swings the lower end of lever 326 forward to move the lug 326ª away from the pawl 333, whereupon said pawl is rocked counterclockwise by a spring 334 to cause its notch 335 to engage over the reduced end of a stud 336 on the member 156, said stud corresponding to stud 155 in Fig. 3—A. The pawl 333 is pivoted at 337 on one arm 338 of a yoke device 339 journaled loosely on the shaft 60. The other arm 340 of this yoke extends rearwardly where it carries a stud 341 (Fig. 8—B) adapted to be engaged by the cam 178 on the shaft 82. As said shaft 82 is rocked counterclockwise through a half revolution, said cam 178 engages stud 341 and rocks the yoke 340—339—338 clockwise, thereby pulling down on the pawl 333 and moving the slide 156 downward. This rocks the lever 160 and pulls the line space bail 164 downward.

Accordingly, when the member 319 is moved forward to start the motor and engage the clutch for driving the shaft 82 through a half revolution, pawl 333 moves forward and connects itself to slide 156 to cause the rocking of shaft 82 to pull down the line spacing bail 164.

The left-hand arm 165 that supports the line spacing bail is pivoted at 166 and its forward end supports a stud 180 which, as heretofore explained, is positioned under the arm 112 carrying the stud 111. When the line spacing bail is pulled downwardly the stud 180 rocks the arm 112 counterclockwise to move the stud 111 into the path of the abutment end 110 of lever 43. Accordingly, the parts will be conditioned so that, as the platen is thrown back, the front-feed throat will be opened.

The member 319 and associated parts are restored to normal by means of a stud 342 (Fig. 8—A) on the arm 340 of the yoke 339. Said stud is adapted to engage a rearward arm 343 of the bell crank 324. Near the end of the downward movement of yoke 338—339—340, the stud 342 rocks bell crank 324 clockwise and said bell crank, in turn, moves the member 319 rearwardly to where the shoulder 322 will re-engage the rear edge of the plate 323 even if the link 54 should still be held in its elevated position by a carriage cam. When the member 319 moved forward, it carried the pawl 318 out of engagement with the lug 317 to permit the rear end of the member 319 to drop as soon as its shoulder 322 is again moved rearward of the rear edge of the plate 323, regardless of the position of the link 54.

It will be recalled that the platen frame has a forward sliding movement as well as a rocking movement, the sliding movement being for the purpose of enabling the platen to be moved to its upper case position. In order to obtain a rocking of the platen frame said frame must be blocked against sliding movement and mechanism for obtaining this result has been heretofore explained. In the modification of the invention now being described, this mechanism has been changed slightly. The platen frame is normally free to move forward for case shift operation, but when the platen is thrown back said frame is automatically locked against case shift movement. Referring to Fig. 8—A, it will be observed that the line space bail 164 has been extended to the left and connected to one end of the lever 350 pivoted at 351 on the carriage frame. The other end of this lever carries a stud 352 positioned over the edge of a lever 353 pivoted on the stub shaft 354, said lever being urged counterclockwise by a spring 355. The forward end of this lever has a shoulder 356 adapted to engage over a stud 357 fixed to the left-hand side plate 30 of the platen frame. In the normal position of the parts shown in Fig. 8—A, the shoulder 356 on the end of the lever 353 is above stud 357 and the platen frame is free for the case shifting. But when the line space bail 164 is pulled down at the time the platen is thrown back, lever 350 is rocked clockwise, which raises stud 352 and frees lever 353 to permit it to be rocked by its spring 355 to move shoulder 356 over stud 357. This locks the platen frame against forward movement.

When it is desired that the platen be moved to throwback position for "reading" purposes, a two-faced cam 360 (Fig. 8—A) is mounted on the control shaft 311 and arranged to engage a roller stud 361 on the end of an arm 362 at the same time that either the pawl 313 or the pawl 315 engages the stud 310. The cam 360 is shaped to act when the carriage is moved in either direction. The arm 362 is pivoted at 363 on the machine frame and it has an abutment edge 364 engaging a stud 365 on a link 366. The lower end of link 366 has a lateral lug carrying a stud 367 positioned over the edge of lever 330. As the link 366 is moved downwardly, the lever 330 will be rocked so that its lug 331 moves below the shoulder of the member 319. Accordingly, when said member 319 is moved forwardly to start the motor and engage the clutch, lever 330 will not be moved forward which means that the pawl 333 will not move forward to engage over stud 336. The result is that during the half rotation of shaft 82, the line space bail 164 will not be moved down in the manner heretofore described. However, said line space bail will be moved down slightly in order to enable the lever 353 to move to position to lock the platen frame against forward sliding movement. For this purpose the pawl 333 has an upper shoulder 368 positioned in the path of the reduced portion of the stud 336, so that, when the pawl 333 is moved downward, slide 156 will be moved down to rock the line space bail 164 sufficiently to release the lever 353 to enable its shoulder to engage the stud 357 and prevent forward movement of the platen frame.

From this it will be clear that the mechanism may be automatically conditioned by the carriage independently of a machine cycle to cause the motor to move the platen to throwback position with the front-feed throat opening at the same time or remaining closed.

*Modified key control*

Figures 8—A and 8—B also show a modified form of key control giving further selectivity in the manner in which the mechanism may be controlled at the option of the operator.

As in the prior construction, when the key 200 (Fig. 8—B) is depressed, it rocks the shaft 60 to start the motor and engage the clutch independently of a cycle of machine operation. This causes the platen to be moved to throwback position and, upon a second depression of the key, the clutch is engaged to cause the platen to be returned to printing position.

When the key 200 is depressed with the parts in the position shown in Figs. 8—A and 8—B, the motor is started, the clutch engaged, and the platen moved to throwback position without opening the throat. The throat is not opened because, at the time the parts operate, member 319 is latched in its rearward position and there is nothing to move the lever 326 forward to enable the pawl 333 to move over the stud 336. Consequently the line space bail 164 is rocked only a short distance sufficient to enable the latch 353 to prevent the platen frame from moving forward.

Provision is made, however, for enabling the key 200 to be used to cause the platen to be moved to throwback position with the front-feed throat open, and upon a second depression to cause the front-feed throat to be closed and the platen to be returned to printing position. For this purpose a manually movable member 370 (Fig. 8—B) is employed which is capable of being moved to two positions in both of which it is releasably held by a spring detent 371. The upper end of the member 370 has a lug 372 engaging an arm 373 fixed on a shaft 374. This shaft extends to the left-hand side of the machine (Fig. 8—A) where it has a crank 375 fixed to it, which crank is connected to the member 330. When the member 370 is moved to its rear position shown in Fig. 8—B, the shaft 374 is rocked counterclockwise thereby pulling the member 330 forward and releasing the pawl 333 for engagement over the stud 336. Then, when the key 200 is depressed to start the motor to move the platen to throwback position, the slide 156 will be moved to rock the line space bail 164 its full distance which will move stud 111 into the path of abutment 110 so that, when the platen moves back, the throat will be opened. Upon a second depression of the key the clutch will be engaged to cause the motor to close the throat and return the platen to printing position.

Thus the motor can be used independently of a machine cycle and at the option of the operator to throw the platen back either with the throat closed or with it open, and to return the platen to printing position and to close the throat if said throat was open.

*Modified paper guiding, paper holding, and line finding assembly*

In the form of the invention first described the paper table and line finder are of the type disclosed in Patent No. 2,055,552 and separate paper holding devices are provided for holding the paper in position when the platen is moved to "reading" position. An improved construction has been devised that accomplishes all the results in one assembly.

Referring to Fig. 9, a support is provided comprising two arms 380 and 381 fixed to a shaft 382 journaled in the brackets 383 fastened to the raceway of the carriage. The support is thus pivoted in front of and it extends toward the platen. The shaft 382 and the arms 380 and 381 are urged counterclockwise in Fig. 9 by torsion springs 384, one end of each of which bears against its respective stationary bracket 383 and the other end against its respective stud 385 on the respective arms 380 and 381. The support is limited in its movement under the urge of springs 384 by the tail pieces 386 on the arms 380 and 381 which limit against the raceway of the carriage and hold the support in what may be called its normal position.

Mounted on the free ends of the arms 380 and 381 are parts that more properly comprise the line finder and the paper table, although the support above mentioned may also be considered as forming a part of the line finder or paper table, or both.

The line finder comprises a metal plate 390 having its upper edge bent slightly and provided with markings as shown in Fig. 9. The ends of the plate are fixed to members 391 which are fixed to a shaft 392. The shaft 392 is journaled in the ends of the arms 380 and 381. Each of the members 391 carries an upper roller 393 and a lower roller 394 adapted to be engaged by the platen as will be later explained, these rollers being illustrated more clearly in their relation to the platen in Figs. 11–16, inclusive. The line finder may be swung about its pivot in the ends of the arms 380 and 381 from the line-finding position of Figs. 9 and 11 to the inactive position shown in Figs. 10 and 15, as will presently appear.

The parts that form what may be called a paper table or chute, or a paper guiding and holding means, are of simple and inexpensive construction and comprise two fingers 400. Each finger has spaced spring arms 401 integral with it, which arms are mounted on the shaft 392. These arms are formed so that they are not quite at right angles to the body of the fingers but tend to diverge slightly. This formation causes them to releasably grip the shaft 392 so as to hold the fingers 400 in the positions to which they may be adjusted and so as to cause them to turn with said shaft. If the operator wants to move one of the fingers laterally he presses the two arms 401 together slightly which frees the finger for easy lateral movement on the shaft. On releasing the arms they spring apart to again grip the shaft.

The fingers 400 have lateral projections 402 on them which extend toward one another. When the fingers 400 are in horizontal position such as illustrated in Figs. 10 and 15, the projections 402 act to support a work sheet as it is fed into the front-feed throat and thus act as a paper table. It is to be observed that the upper ends of the fingers are curved. This enables them to serve two purposes. First, it enables the fingers to fit about the platen when they occupy the position shown in Figs. 9 and 16, and thus they are able to hold the upper end of a work sheet against falling forward and in a position to enable the entries to be easily read. This is particularly valuable when the platen is thrown back to "reading" position, although it is also useful when the platen is in throwback position with the throat open. The second function for the curved fingers is that, when they are in the horizontal position of Fig. 10, their outer ends extend upward and thus act as side guides. In other words, these simple, inexpensive paper fingers act as a paper table, as side guides, and as devices for holding the paper in position when the platen is thrown back.

While the line finder and paper table have been described separately, it will be apparent that the paper fingers may be considered a part of the line finder assembly and need not be designated as a paper table. Or the whole assembly may be considered a sheet guiding, supporting, holding, and line finding or collating means.

Means is provided which tends to move the line finder assembly either to a line finding and sheet-holding position or to a sheet-receiving position, depending upon how said means is conditioned. In the embodiment of the invention illustrated this means comprises springs 403, the right hand one of which is shown in Fig. 9. The description will be confined to the right-hand spring. This spring is connected at one end to a stud 404 on the right-hand member 391 and at its other end to the arm 380 of the support. A similar spring is provided on the left-hand side of the assembly. It will be apparent that, when the parts are in the position shown in Fig. 9 with the spring 403 below the axis of the shaft 392, the spring will tend to rock the line finder assembly clockwise to line finding and sheet-holding position, but, if the line finder assembly is turned about the axis of the shaft 392 until the spring 403 moves above the center of said axis, then said spring will tend to move the line finder assembly to the substantially horizontal sheet-receiving position illustrated in Figs. 10 and 15. In order to further explain the apparatus, a position of the parts will be assumed and operations followed through.

Assume that the platen is in its throwback position with the front-feed throat open and with the line finder assembly in a sheet-receiving position such as illustrated in Figs. 10 and 15. The operator inserts a sheet over the paper table and between the side guiding portions of fingers 400 into the front-feed throat to an approximately correct position. He then grasps the fingers 400 and the sheet and turns the line finder assembly rearwardly. As this occurs the spring 403 passes below the axis of the shaft 392, whereupon the tension of said spring acts to hold the line finder assembly table in line finding and sheet-holding position as shown in Fig. 11. While these parts hold the paper about the platen so that it will not fall forward and so that the entries can be easily read, they do not hold the paper so tightly as to prevent the operator from moving it up and down to get it into exact line space position.

After the operator has adjusted the sheet to its proper position he causes the throat to be closed and the platen to be returned to printing position by means of the mechanism heretofore described. He need not, in fact, pay any more attention to the paper. All he need do is to start entering the next amount because, upon depression of the first amount key, the throat will be closed automatically and the platen returned to printing position.

As the platen returns to printing position it engages the rollers 393 and 394 rather than the line finder blade so that no smudging will be caused as the platen is moved to printing position.

As the platen completes its movement to printing position, rollers 393 and 394 turn the shaft 392 with the line finder assembly to the position illustrated in Fig. 13 where the spring 403 is below the axis of the shaft 392. The arms 380 and 381 carrying said shaft 392 are moved downwardly against the tension of the springs 384, but the line finder assembly remains in approximate sheet-holding position.

As the platen next moves away fom printing position (Fig. 13) it moves in an arc toward the line finder as shown in Fig. 14 and in the early part of such movement, it prevents counterclockwise movement of arms 380 and 381 but causes the line finder 390 with its end pieces 391 to turn about the axis of shaft 392 to move springs 403 above the axis of shaft 392, as shown in Fig. 14. As the platen continues to move upward it moves away from the line finder which enables arms 380 and 381 to move up to their horizontal position while springs 403 hold the line finder in sheet-receiving position, as shown in Fig. 15. In other words, when the platen is moved from throwback to printing position with the line finder in line finding and sheet-holding position, the assembly is conditioned so that, when the platen is next moved from printing position, said line finder and paper table normally will be moved to sheet-receiving position.

Assuming that, when the platen moves away from printing position as just explained, the machine is conditioned so that the front-feed throat will be opened, the parts are again in the position they occupied when the assumed operation was started, and the operator may insert a new sheet and proceed as before.

When the platen is moved to throwback position for the purpose of reading the entries, the line finder and paper table are automatically controlled so that they hold the work sheet from falling forward and so that said sheet is in position to enable the entries to be easily read with the line finder defining the line that has just been printed. This result is obtained as follows:

The stud 404 (Fig. 9) to which the spring 403 is connected extends laterally sufficiently far to be positioned under an arm 405 pivoted loosely on the shaft 382. This arm has a shoulder 406 adapted to engage a lug 407 on a yoke 408, one arm of the yoke being pivoted on the shaft 382 and the other on a stud 409 in the side frame 34 of the carriage. If the arm 405 is blocked against counterclockwise movement (Fig. 9) at the time the platen is moved away from printing position, said arm will prevent the line finder assembly from turning about the axis of the shaft 392, even though the springs 403 tend to cause such movement. Then, as the arms 380 and 381 move upwardly, the shaft 392 will move above the springs 403, whereupon the direction of action of said springs is reversed and they tend to hold the line finder assembly in line finding and sheet-holding position.

While the torsion springs 384 are stronger than the springs 403 and will operate to move arms 380 and 381 upward under normal conditions, provision has been made for positive action in the form of an arm 410 (Fig. 9) pivoted on the side frame 34 and provided with a hooked end adapted to be engaged by a stud 411 on the platen frame. As the platen frame swings upwardly the stud 411 engages the hooked end of arm 410 and positively pulls the supporting arms 380 and 381 to normal position.

Whether or not the arm 405 is blocked depends upon the automatic control of certain parts which will now be described. The yoke 408 is urged clockwise in Figs. 8—A and 9 by a spring 415, said yoke having an abutment shoulder 416 limiting against a stationary part of the carriage frame. Said yoke has a lateral lug 417 adapted to engage under a shoulder on a latch lever 418 pivoted at 419 on the carriage side plate 34. This lever is connected by a link 420 to ne arm 421 of a bell crank lever pivoted to frame 34 at 422 and having another arm 423 provided with a cam edge 424 engaged by a stud 425 on the arm 165 that supports the line space bail 164. The arm 165 is pivoted on the stud 166 on the side plate 34. It will be recalled that when the platen is moved to throwback position and the front-feed throat opened, the line space bail 164 is moved its full distance, whereas, when the platen is moved to throwback position with the front-feed throat closed, said bail is moved a shorter distance. When the bail 164 is moved to its full distance the stud 425 engages the cam edge of bell crank 423—421 and rocks said bell crank counterclockwise (Fig. 9). This pulls the link 420 rearward and rocks the latch 418 counterclockwise so that its shoulder moves away from over the lug 417 on yoke 408. This leaves the yoke 408 free to move counterclockwise and, under such conditions, i. e., when the platen is moved to throwback position with the front-feed throat open, stud 404 can engage the arm 405 and move said arm with it because the shoulder 406 is not blocked by the lug 407 on yoke 408 owing to the fact that the yoke is free to move. But, when the line space bail 164 is moved only a short distance, as when the platen is moved to throwback position with the throat closed, stud 425 does not cam the bell crank 423—421 far enough to release the latch 418. Consequently the yoke 408 is held against counterclockwise movement and, when the platen is thrown back and the stud 404 engages the arm 405, said arm cannot move whereby the line finder assembly is prevented from moving to sheet-receiving position as it normally does.

As the platen completes its movement to throwback position, the arms 380 and 381 are moved to normal, which moves the line finder up to a position to enable the operator to read the entry that has been printed, said line finder then being slightly below the position it occupied when it was moved manually to line finding position with the platen in throwback position and the throat open. The line finder is thus moved automatically to position to determine the line that has just been printed. The paper fingers hold the sheet in substantially vertical position and in a position where the entry may be easily read by the operator.

From the above it will be clear that when the platen is moved to a throwback position with the throat closed, the line finder and paper fingers automatically are caused to move to a position to determine the line that has just been printed and to hold the paper against falling forward and in a position to enable the operator to easily read the entry. This may occur automatically when the platen is thrown back under the control of the carriage, or it can occur at the option of the operator when he depresses the key that governs the throwing back of the platen to reading position. When the platen is moved to throwback position with the throat open, the line finder and paper fingers automatically move to sheet-receiving position. When the platen is in its throwback position either with the throat closed or open, the operator need pay no attention to the return of the platen to printing position. As soon as he depresses the first amount key in making the next entry, the parts will be moved to proper position to hold the paper in printing relation to the platen.

The case shift operation is also slightly different in the modified construction. When the case shift key 280 (Fig. 8—B) is depressed, it rocks a bell crank 430 which is one side arm of a yoke 431 attached to the shaft 60. Thus, when the case shift key is depressed, the shaft 60 is rocked to close the motor circuit and engage the clutch, as has been previously explained. The upper end of the bell crank 430 has a notch 432 in it, and the end of this arm of the bell crank is adapted to pass under a lug 433 on an arm 434 fixed to the shaft 374. When the case shift key is depressed, the end of the upper arm of bell crank 430 moves under the lug 434 and thus prevents the arm 375 with its lever 330 from being moved while the case shift key is depressed. Likewise, when the arm 375 is moved, the lug 433 moves into the notch 432 and prevents the case shift key from being depressed. Thus, there is an interlock both ways between the case shift key and the arm 375 with its lever 330.

Referring to Fig. 8—A, the pawl 333 has a downward extension provided with a notch 435. This notch is engaged, under certain circumstances, by a lug 436 on a lever 437 pivoted loosely on the shaft 60. The lever 437 has a tail 438 positioned over the yoke 431. The lever 437 is urged counterclockwise, as viewed in Fig. 8—A, by a spring 440.

When the case shift key is depressed, the yoke 431 moves away from the tail piece 438 on lever 437 thereby freeing lever 437 for counterclockwise movement. The spring 440 thereupon moves lever 437 so that its lug 436 moves into the notch 435 in the lower end of pawl 333. Depression of the case shift key also starts the motor, causes the clutch to be engaged, and the shaft 82 is rocked a half revolution counterclockwise in Fig. 8—B. The cam 178 (Fig. 8—B) engages the stud 341 and rocks the arm 340 clockwise which, in turn, rocks the arm 338 clockwise and pulls the pawl 333 downward. At this time the pawl 333 is held against turning about its pivot 337 by the lug 436 and thus said pawl moves as though it were rigid with arm 338, that is, the upper end of said pawl moves in an arc. This causes the upper end of the pawl to clear the stud 336 entirely, with the result that the member 156 is not pulled down and consequently the line space bail 164 is not rocked. Accordingly, the stud 352 (Fig. 8—A) will not release the latch 353 and, when the yoke 94 is rocked to move the platen frame, said frame will slide forward instead of rocking on its axis. Thus, the platen will be moved to upper case position.

When the platen is thrown back, the above-mentioned parts associated with the case shift operate in the following manner. Pivoted loosely on the stud 337 carried by arm 338 is a pawl 441 having a notched shoulder 442 on its lower end, said pawl being urged counterclockwise by spring 446. When the parts are in normal position the pawl 441 is held inactive by the engagement of a lug 443 on said pawl with a stationary piece 444, said stationary piece holding said pawl in a clockwise position from the position to which it is urged by spring 440. During the early part of the throwback operation, when the arm 338 starts to move clockwise, the pawl 441 is carried downward and, in so moving, its lug 443 moves away from the stationary member 444. Thereupon, the pawl 441 moves counterclockwise so that the shoulder of its notch 442 is over the lug 436 on lever 437. Accordingly, as the arm 438 moves downwardly, the pawl 441 engages lug 436 and moves it downward, thereby preventing the lower end of the pawl 333 from moving behind said lug 436. The pawl 333 is thus kept free to engage the stud 336, in the manner heretofore described for throwback operations. The above-described operation does not interfere with the case shift control because, when the case shift key is depressed, the lug 436 immediately moves into notch 435 and past the pawl 441 so that said pawl 441 cannot engage lug 436 as said pawl moves downward.

As the platen is lowered from throwback to printing position, the cam 178 (Fig. 8—B) restores the arm 338 upward to normal position, whereupon the lug 443 on pawl 441 engages the stationary member 444 which causes said pawl to be moved to an inactive position to free the lug 436.

It is to be understood that the construction shown is for purposes of illustration only and that variations may be made in it without departing from the spirit and the scope of the invention as defined by the appended claims.

I claim:

1. In a front-feed machine of the class described adapted to be driven through cycles of operation, the combination of front-feed means for receiving and holding a work sheet in front-fed position, said front-feed means being movable from a closed to an open-throat condition and vice versa, a normally inactive electric motor, direct independent driving connections between said motor and said front-feed means, and means controlling said motor and driving connections operable to energize said motor and to condition said driving connections to cause said front-feed means to be moved to open-throat condition by said motor.

2. In a front-feed machine of the class described adapted to be given cycles of operation, printing mechanism operating at a predetermined time during a machine cycle, a platen, means for receiving and holding a work sheet in front-fed position in front of said platen, said means being movable from a closed to an open-throat condition and vice versa, a normally inactive electric motor, direct driving connections between said motor and said means enabling said motor to operate said means independently, and means operating automatically during a cycle of machine operation, and after operation of said printing mechanism, to energize said motor and to condition said driving connections to cause said motor and connections to automatically move said receiving and holding means to open-throat condition independently of the operation of other parts of said machine.

3. In a front-feed machine of the class described having a normally inactive electric motor, means for causing said motor to give said machine cycles of operation, and printing mechanism, the combination of a platen movable from printing position relative to said printing mechanism to a front-feed position and vice versa, means for receiving and holding a work sheet in front-fed position relative to said platen, said means being movable from closed to open-throat condition and vice versa, an independent direct driving connection for enabling said motor to move said platen and operate said receiving and holding means, and means for energizing said motor and causing said driving connections to automatically move said platen from printing to front-feed position and said receiving and holding means to open-throat condition.

4. In a front-feed machine of the class described having an electric motor with driving connections to said machine for giving it cycles of operation, the combination of front-feed means for receiving and holding a work sheet in front-fed position, said front-feed means being movable from closed to open-throat condition and vice versa, direct driving connections between said motor and said front-feed means operable independently of said cycling connections, and means controlling said motor and said driving connections for causing said motor and connections to operate to automatically move said front-feed means to open-throat condition.

5. In a front-feed machine of the class described having general operating mechanism, a platen, the combination of means for receiving and holding a work sheet in front-fed position relative to said platen, said means being movable from closed to open-throat condition and vice versa, a normally inactive electric motor, a switch for said motor, direct independent driving connections between said motor and said receiving and holding means including a clutch and a cam mechanism, said driving connections being operable without causing a cycle of operation of said general operating mechanism, and means for closing said switch and engaging said clutch to cause said motor to operate said cam mechanism to move said receiving and holding means to open-throat condition, said cam mechanism operating to hold said receiving and holding means in open-throat condition.

6. A front-feed machine of the class described having a mechanism normally operated during a machine cycle to perform a particular function, printing means, front-feed means for receiving and holding a work sheet in front-fed position, said front-feed means being movable from a closed to an open-throat condition and vice versa, a normally inactive electric motor, direct driving connections between said motor and said front-feed means enabling said motor to operate said front-feed means independently, and means controlled automatically in accordance with the condition of said mechanism that is normally operated during a machine cycle for causing said electric motor to be automatically energized during said cycle and after said mechanism has operated to thereby cause said motor and driving connections to automatically move said front-feed means to open-throat condition.

7. A front-feed machine of the class described having a printing mechanism normally operating at a predetermined time during a machine cycle, front-feed means for receiving and holding a work sheet in front-fed position, said front-feed means being movable from closed to open-throat condition and vice versa, columnar-printing control means for controlling the column in which printing occurs, a normally inactive electric motor, direct driving connections between said motor and said front-feed means operable independently of a machine cycle, and means controlled automatically in accordance with the column in which printing occurs for automatically energizing said motor during a machine cycle after said printing mechanism has operated and causing said driving connections to automatically open said front-feed throat.

8. In a front-feed machine of the class described adapted to be given cycles of operation, a general operating mechanism, front-feed means for receiving and holding a work sheet in front-fed position, said front-feed means being movable from closed to open-throat condition and vice versa, a normally inactive electric motor, driving connections between said motor and said front-feed means, columnar-printing control means, and means conditioned automatically in accordance with the column in which printing occurs and operated by said general operating mechanism during the latter part of a cycle of machine operation for energizing said motor and causing it to automatically open said front-feed throat as an incident to said machine cycle.

9. In a front-feed machine of the class described having a normally inactive electric motor with connections to said machine for giving said machine cycles of operation, the combination of a printing mechanism, a travelling paper carriage supporting a platen which is movable from a printing position relative to said printing mechanism to a front-feed position and vice versa, means on said carriage for receiving and holding a work sheet in front-fed position relative to closed and for causing said holding devices to move to sheet holding position to prevent the paper from falling forward.

45. A machine of the class described having a platen, means for receiving and holding a work sheet in front-fed position relative to said platen, said platen and receiving and holding means being movable from closed to open-throat condition and vice versa but being urged to closed-throat condition, an electric motor and connections for moving said platen and receiving and holding means to closed-throat condition, said motor and connections governing the closing of said throat so as to close the same in a uniform quiet manner.

46. A machine of the class described having a printing mechanism, a platen movable from a printing position relative to said printing mechanism to a front-feed position and vice versa, but being urged to printing position, means for receiving and holding a work sheet in front-fed position relative to said platen, said means being movable from closed to open-throat condition and vice versa, but being urged to closed-throat condition, an electric motor and connections for moving said platen to front-feed position and said means to open-throat condition, said electric motor and connections being also operable to govern the return of said platen and the closing of said throat so that both take place in a uniform gradual manner.

47. A machine of the class described having a printing mechanism, a platen frame slidable from one case shift position to another and rockable about an axis to enable the platen to move from printing position relative to said printing mechanism to a front-feed position and vice versa, power means for applying force to said platen frame to move it, means normally latching said platen frame against sliding movement whereby, when said force is applied, the frame will be rocked about its axis from printing to front-feed position, and a case shift key and connections for releasing said platen frame for sliding movement whereby, when said force is applied, said platen frame will be moved from one case shift position to another.

48. In a front-feed machine of the class described having general operating mechanism adapted to be given cycles of operation, and a normally inactive electric motor for cycling said general operating mechanism, the combination of a platen, means for receiving and holding a work sheet in front-fed position relative to said platen, said means being movable from a closed to an open-throat condition and vice versa, independent direct driving connections between said motor and said receiving and holding means for enabling said motor to operate said front-feed means independently of the cycling of said general operating mechanism, and means controlling said motor and driving connections operable to energize said motor and to condition said driving connections to cause said receiving and holding means to be moved to open-throat condition independently of a cycle of operation of said general operating mechanism.

49. In a front-feed machine of the class described having general operating mechanism, and a normally inactive electric motor for cycling said general operating mechanism, the combination of a traveling carriage, printing means, a platen, means for receiving and holding a work sheet in front-fed position relative to said platen, said means being movable from a closed to an open-throat condition and vice versa, direct driving connections between said motor and said receiving and holding means enabling said motor to operate said receiving and holding means independently of a cycle of said general operating mechanism, and means conditioned by said carriage as it moves into a predetermined position for energizing said electric motor and conditioning said driving connections to cause said front-feed throat to be opened independently of a cycle of said general operating mechanism.

50. In a front-feed machine of the class described having a normally inactive motor for giving it cycles of operation, the combination of a printing mechanism, a platen, means for receiving and holding a work sheet in front-fed position relative to said platen, said means being movable from a closed to an open-throat condition and vice versa, independent direct driving connections from said motor to said receiving and holding means for enabling said motor to operate said receiving and holding means directly, and key controlled means for energizing said electric motor and conditioning said driving connections at the option of the operator to cause said motor and connections to move said receiving and holding means to open-throat condition without causing a cycle of operation of said machine.

51. In a front-feed machine of the class described having general operating mechanism adapted to be given cycles of operation, and a normally inactive electric motor for cycling said general operating mechanism, the combination of a printing mechanism, a platen, means for receiving and holding a work sheet in front-fed position relative to said platen, said means being movable from a closed to an open-throat condition and vice versa, independent direct driving connections from said motor to said receiving and holding means for enabling said motor to operate said means, and means conditioned by depression of a key for energizing said electric motor and conditioning said independent driving connections to cause said motor and connections to move said receiving and holding means to open-throat condition, said key and independent driving connections being operable, upon a second depression of said key, to energize said motor and condition said driving connection to cause them to move said front-feed means to closed-throat condition.

52. A front-feed machine of the class described having general operating mechanism, a printing mechanism, a platen carried by a support that is movable to move said platen from a printing position relative to said printing mechanism to a throwback position and vice versa, means for receiving and holding a work sheet in front-fed position relative to said platen, said means normally being movable from a closed to an open-throat condition, as said platen is moved to throwback position, means for governing said receiving and holding means so that the throat remains closed when said platen is moved to throwback position, a normally inactive electric motor for cycling said general operating mechanism, direct driving connections between said motor and said platen support and said receiving and holding means for operating them independently of a cycle of said general operating mechanism, key controlled means for conditioning said motor and driving connections to move said platen to throwback position independently of a cycle of said general operating mechanism, and means for selectively conditioning said key controlled means so that said key means may be used to move the platen to throwback position with the front-feed throat opening or with it remaining closed.

53. A front-feed machine of the class described having a printing mechanism, a platen movable from a printing position relative to said printing mechanism to a throwback position and vice versa, means for receiving and holding a work sheet in front-fed position relative to said platen, said means being movable from a closed to an open-throat condition and vice versa, a line finder movable from an inactive to an active line-finding position in engagement with the work sheet, means for moving said platen to throwback position, and means automatically operable as said platen is moved to throwback position for causing said line finder to be moved to line-finding position, said line finder having portions acting, when it is so moved, to hold the upper end of the work sheet about said platen in a position to enable entries to be easily read with the line finder defining the line for one of the entries, whereby said line will appear in a defined and readily readable position in front of the operator.

54. A front-feed machine of the class described having a printing mechanism, a platen movable from a printing position relative to said printing mechanism to a throwback position and vice versa, columnar-printing control means for controlling the column in which printing occurs, means for receiving and holding a work sheet in front-feed position relative to said platen, said means being movable from a closed to an open-throat condition and vice versa, a line finder movable from an inactive to an active line-finding position, means for moving said platen to its throwback position, and means automatically operating as said platen is moved to throwback position, and governed in accordance with the column in which printing occurs, for causing said line finder to be moved to a line finding position, said line finder having portions acting, when it is so moved, to hold the upper end of the work sheet about said platen in a position to enable entries to be easily read with the line finder defining the line for one of said entries.

55. A front-feed machine of the class described having a printing mechanism, a platen movable from a printing position relative to said printing mechanism to a throwback position and vice versa, means for receiving and holding a work sheet in front-fed position relative to said platen, said means being movable from a closed to an open-throat condition and vice versa, a movable line finder having an inactive position and an active line-finding position, means for moving said platen to its throwback position, means normally acting as said platen is moved to throwback position to cause said receiving and holding means to be moved to open-throat condition and said line finder to be positioned in inactive position, and means governing said line finder and receiving and holding means operable, as said platen is moved to throwback position, to cause said receiving and holding means to remain in closed-throat condition and said line finder to be positioned in line finding position, said line finder having portions acting, when it is so positioned, to support the upper end of the work sheet about said platen in a position to enable entries to be easily read with the line finder defining one of said entries, whereby the entry on said sheet will appear in a readily readable position while said sheet is held by said line finder and said receiving and holding means.

56. A front-feed machine of the class described having a printing mechanism, a traveling paper carriage, a platen on said carriage movable from a printing position relative to said printing mechanism to a throwback position and vice versa, a paper chute for receiving a work sheet and guiding it to front-fed position relative to said platen, sheet-engaging devices adapted to engage an inserted sheet to hold it against said platen, said sheet-engaging devices and platen being mounted to enable a relative movement to occur between them, a movable line finder having an inactive position and an active line-finding position, means for moving said platen to throwback position, means normally acting as said platen is moved to throwback position to cause a relative movement between said sheet-engaging devices and platen and to position said line finder in inactive position, and means governed by said paper carriage operating automatically as said platen is moved to throwback position to cause said sheet-engaging devices and platen to remain in engagement and said line finder to be positioned in line finding position, said line finder having portions acting, when it is so positioned, to support the upper end of the work sheet about said platen in a position to enable entries to be read with the line finder defining the line for one of said entries, whereby the entry on said sheet will appear in a readily readable position while said sheet is held by said line finder and sheet-engaging devices.

57. A front-feed machine of the class described having a printing mechanism, a platen movable from a printing position relative to said printing mechanism to a throwback position and vice versa, a line finder movable from an inactive position to an active line-finding position relative to said platen and vice versa, means for automatically moving said line finder to its active line-finding position as said platen moves to throwback position, and means acting automatically, as said platen is moved from throwback to printing position with said line finder in active position, for conditioning said line finder and its moving means so that, when said platen is next moved from printing position, said line finder will be automatically moved to inactive position.

58. A front-feed machine of the class described having a printing mechanism, a platen movable from printing position relative to said printing mechanism to a throwback position and vice versa, a combination paper table and line finder movable from a sheet-receiving to a sheet-holding and line-finding position, means for automatically moving said paper table and line finder to its sheet-holding and line-finding position as said platen is moved from printing position to throwback position, and means acting automatically, as said platen is moved from throwback position to printing position with the paper table and line finder in sheet-holding and line-finding position, to condition said line finder and its moving means so that, when the platen is next moved from printing position the paper table and line finder will be moved to sheet-receiving position.

59. A front-feed machine of the class described having a printing mechanism, a platen movable from a printing position relative to said printing in said machine while said receiving and holding means is in open-throat condition, to automatically move said platen to printing position and said receiving and holding means to closed-throat condition.

28. In a front-feed machine of the class described having an electric motor with driving connections to said machine for giving said machine cycles of operation, a printing mechanism, and a traveling paper carriage movable from one position to another during a machine cycle, the combination of a platen mounted on said carriage and movable from a printing position relative to said printing mechanism to an out-of-printing position and vice versa, driving connections between said motor and platen independent of said cycling connections, and means for conditioning said electric motor and independent driving connections to move said platen from printing to out-of-printing position while said machine remains uncycled and independent of movement of said carriage.

29. In a front-feed machine of the class described having general operating mechanism, adapted to be given cycles of operation, and a normally inactive electric motor for giving said mechanism cycles of operation, the combination of a printing mechanism, a traveling carriage, a platen having a movable support making said platen movable from a printing position relative to said printing mechanism to an out-of-printing position and vice versa, direct driving connections from said motor to said platen support for moving said platen from printing to out-of-printing position, and key controlled means for energizing said electric motor and conditioning said driving connections to cause said motor and connections to move said platen from printing to out-of-printing position without causing a cycle of operation of said general operating mechanism or a movement of said carriage.

30. A front-feed machine of the class described having a general operating mechanism adapted to be given cycles of operation in the performance of machine functions, printing means, front-feed means for receiving and holding a work sheet in a substantially vertical front-fed position, said front-feed means being movable from a printing position relative to said printing mechanism to an out-of-printing position and vice versa, a normally inactive electric motor, direct driving connections from said motor to said front-feed means, and key controlled connections operable, when said front-feed means is in printing position, to start said motor and condition said driving connections to cause said front-feed means to be moved to out-of-printing position without causing a cycle of operation of said general operating mechanism.

31. In a front-feed machine of the class described having an electric motor with connections to said machine for giving it cycles of operation, the combination of a printing mechanism, a platen movable from a printing position relative to said printing mechanism to an out-of-printing position and vice versa, independent direct driving connections between said motor and platen for moving said platen from one position to another, and means for conditioning said motor and platen driving connections to cause said motor to move said platen from out-of-printing to printing position without causing a cycle of operation of said machine.

32. In a front-feed machine of the class described having a general operating mechanism adapted to be given cycles of operation in the performance of machine functions, the combination of printing means, front-feed means for receiving and holding a work sheet in a substantially vertical front-fed position, said front-feed means being movable from a printing position relative to said printing mechanism to an out-of-printing position and vice versa, a normally inactive electric motor, direct driving connections from said motor to said front-feed means, and key controlled connections operable when said front-feed means is in out-of-printing position to start said motor and condition said driving connections to cause said front-feed means to be moved to printing position without causing a cycle of operation of said general operating mechanism.

33. A machine of the class described having a printing mechanism, a platen movable from printing position relative to said mechanism to an out-of-printing position and vice versa, power means having connections to said platen for moving it, and a key and connections operable, upon depression of said key, to cause said power means to move said platen from printing to out-of-printing position, said key and connections having portions operating upon a second depression of said key to cause said power means to return said platen to printing position.

34. A machine of the class described having a printing mechanism, a platen movable from printing position relative to said mechanism to an out-of-printing position and vice versa, a normally inactive electric motor having driving connections to said platen for moving the same, and a key and connections operable upon depression of said key to start said motor and cause it to move said platen from printing to out-of-printing position, said key and connections having portions operable upon a second depression of said key to again start said motor and cause said platen to be returned to printing position.

35. In a machine of the class described the combination of a printing mechanism, a platen having a movable support making said platen movable from printing position relative to said printing mechanism to an out-of-printing position and vice versa, a normally inactive electric motor having direct driving connections to said platen support for moving it from one position to the other, and key controlled means operable, upon depression of said key, to energize said motor and condition said driving connections to move said platen from printing to out-of-printing position, said key and connections having portions operating upon a second depression of said key to cause said motor and driving connections to return said platen to printing position.

36. In a machine of the class described the combination of a printing mechanism, a front-feed means movable from printing position relative to said printing mechanism to an out-of-printing position and vice versa, a normally inactive electric motor having direct driving connections for moving said front-feed means, and key controlled means operable, upon depression of a key, to energize said motor and condition said driving connections to move said front-feed means from printing to out-of-printing position, said key and connections having portions operating upon a second depression of said key to cause said motor and driving connections to return said front-feed means to printing position.

37. A machine of the class described adapted to be given cycles of operation, having a printing mechanism, a front-feed means movable from printing position relative to said printing mechanism to an out-of-printing position and vice versa, a normally inactive electric motor having direct driving connections including a cam mechanism for moving said front-feed means, and key controlled means operable upon depression of a key to energize said motor and condition said driving connections to move said front-feed means from printing to out-of-printing position, said cam mechanism serving to hold said front-feed means in said position, said key and connections having portions operating upon a second depression of said key to cause said motor and driving connections to operate said cam mechanism to cause the return of said front-feed means to printing position.

38. A front-feed machine of the class described having a printing mechanism, a platen movable from a printing position relative to said printing mechanism to a front-feed position and vice versa, means for receiving and holding a work sheet in front-fed position, said means being movable to open-throat condition as said platen is moved to front-feed position, and power means operable to automatically move said platen from printing to front-feed position while said front-feed throat remains closed to enable the operator to read an entry on the sheet without disturbing its position about the platen.

39. A front-feed machine of the class described having a printing mechanism, a platen movable from printing position relative to said mechanism to a front-feed position and vice versa, means movable from closed to open-throat condition as said platen is moved from printing to front-feed position, power means having driving connections for moving said platen, columnar-printing control means controlling said power means and its connections for causing them to move said platen to front-feed position and said movable means to open-throat condition, and means controlled automatically in accordance with the column in which printing occurs for causing said power means and its connections to move said platen from printing to front-feed position with said front-feed throat remaining closed.

40. A front-feed machine of the class described having a printing mechanism, a platen movable from a printing position relative to said printing mechanism to a front-feed position and vice versa, means for receiving and holding a work sheet in front-fed position relative to said platen, said means being movable from a closed to an open-throat condition and vice versa, power means having connections for moving said platen, columnar-printing control means for conditioning said power means and its connections for moving said platen to front-feed position and said receiving and holding means to open-throat condition after printing occurs in a predetermined column, and a key and connections operable at the option of the operator for conditioning said power means and its connections to cause them, in any column where said throat is closed, to automatically move said platen from printing to front-feed position with said front-feed throat remaining closed.

41. A front-feed machine of the class described having a printing mechanism, a traveling paper carriage provided with a platen movable from a printing position relative to said printing mechanism to a front-feed position and vice versa, means for receiving and holding a work sheet in front-fed position relative to said platen, said means being movable from a closed to an open-throat condition and vice versa, power means having connections to said platen for moving the same, said power means and its connections being controlled by said carriage to move said platen from printing to front-feed position and to move said receiving and holding means to open-throat condition automatically in a predetermined position of said carriage, and key controlled means operable at the option of the operator for conditioning said power means and its connections to cause them, in any position of said carriage where said throat is closed, to move said platen to front-feed position with said throat remaining closed.

42. A machine of the class described having a printing mechanism, a platen movable from printing position relative to said mechanism to an out-of-printing position and vice versa, power means having connections with said platen for moving said platen from printing to out-of-printing position, sheet holding devices for holding the front end of a sheet against falling forward when the platen is moved to out-of-printing position, said devices being normally inactive, and means for causing said power means to move said platen to out-of-printing position and automatically to move said holding devices to sheet holding position.

43. A machine of the class described having a printing mechanism, a platen movable from printing position relative to said printing mechanism to front-feed position and vice versa, means for receiving and holding a work sheet in front-fed position relative to said platen, said means being movable from closed to open-throat condition and vice versa, power means having connections to said platen for moving it, sheet holding devices for holding a sheet about said platen to prevent the sheet from falling forward, means for conditioning said power means and said connections to cause said platen to be moved from printing to front-feed position and said receiving and holding means to open-throat condition while said paper holding devices remain inactive, and means for conditioning said power means and said connections to cause said power means to move said platen from printing to front-feed position while said front-feed throat remains closed and for causing said sheet holding devices automatically to move to sheet holding position to prevent the sheet from falling forward to thereby enable the entries on the work sheet to be easily read.

44. A machine of the class described having a printing mechanism, a traveling paper carriage having a platen movable from printing position relative to said mechanism to a front-feed position and vice versa, means for receiving and holding a work sheet in front-fed position relative to said platen, said means being movable from closed to open-throat condition and vice versa, paper holding devices for holding the front end of a work sheet against falling forward, said devices being normally inactive, means controlled by said paper carriage in a predetermined position for causing said power means to move said platen from printing to front-feed position and said receiving and holding means to open-throat condition while said holding devices remain inactive, and means controlled by said carriage in another position for causing said power means to move said platen from printing to front-feed position while said front-feed throat remains mechanism to a throwback position and vice versa, a line finder movable from an inactive position to an active line-finding position relative to said platen and vice versa, means for moving said line finder to its respective positions, means acting automatically, as said platen is moved from throwback to printing position with said line finder in active position, for conditioning said line finder and its moving means so that, when said platen is next moved from printing position, said line finder will be automatically moved to inactive position, and means operable to prevent said line finder from being so moved when said platen is moved from printing position, whereby said line finder may be caused to remain in active position when said platen moves to throwback position.

60. A front-feed machine of the class described having a printing mechanism, a platen movable from a printing position relative to said printing mechanism to a throwback position and vice versa, a combination paper table and line finder movable from a sheet-receiving to a sheet-holding and line-finding position relative to said platen and vice versa, moving means for moving said paper table and line finder toward its respective positions, means acting automatically, as said platen is moved from throwback to printing position with said paper table and line finder in sheet-holding and line-finding position, for conditioning said line finder and its moving means so that, when said platen is next moved from printing position, said paper table and line finder will be moved to sheet-receiving position, and means operable to prevent said paper table and line finder from being so moved when said platen is moved from printing position, whereby said paper table and line finder remain in sheet-holding and line-finding position.

61. A front-feed machine of the class described having a printing mechanism, a platen movable from printing position relative to said printing mechanism to a throwback position and vice versa, means for receiving and holding a work sheet in front-fed position relative to said platen, said means being normally movable from a closed to an open-throat condition when the platen is moved from printing to throwback position, a line finder movable from an inactive to an active line-finding position relative to said platen and vice versa, means for moving said line finder toward its respective positions, means operating automatically, as said platen is moved from throwback to printing position with the line finder in active position, for conditioning said line finder and its moving means so that, when said platen is next moved from printing position, the line finder will be automatically moved to an inactive position, means for moving said platen from printing to throwback position with said front-feed throat remaining closed, and means operating automatically as said platen is moved to the latter position to prevent said line finder from moving to inactive position whereby it remains active to determine the line that has just been typed and to hold the sheet in position to be easily read by the operator.

62. A front-feed machine of the class described having a printing mechanism, a platen movable from printing position relative to said printing mechanism to a throwback position and vice versa, means for receiving and holding a work sheet in front-fed position relative to said platen, said means being normally movable from a closed to an open-throat condition when the platen is moved from printing to throwback position, a combination paper table and line finder movable from a sheet-receiving to a sheet-holding and line-finding position relative to said platen and vice versa, means for moving said paper table and line finder toward its respective positions, means operating automatically, as said platen is moved from throwback to printing position with the paper table and line finder in sheet-holding and line-finding position, for conditioning said line finder and its moving means so that, when said platen is next moved from printing position, the paper table and line finder will be automatically moved to sheet-receiving position, means for moving said platen from printing to throwback position with said front-feed throat remaining closed, and means operating automatically as said platen is moved to the latter position to prevent said paper table and line finder from moving to sheet-receiving position whereby it remains active to determine the line that has just been typed and to hold the sheet in position to be easily read by the operator.

63. A front-feed machine of the class described having a printing mechanism, a platen movable from printing position relative to said printing mechanism to a throwback position and vice versa, a line finder support pivoted in front of and extending toward said platen, a line finder pivoted on the end of said support so that the line finder may be moved from an inactive position to an active line-finding position relative to said platen and vice versa, means for moving said line finder about its pivot to its respective positions, and means acting automatically on said pivoted support and on said line finder, as said platen is moved from throwback to printing position with the line finder in line-finding position, to condition said line finder moving means so that, when the platen is next moved from printing position, the line finder will be turned about its pivot to inactive position.

64. A front-feed machine of the class described having a printing mechanism, a platen movable from printing position relative to said mechanism to a throwback position and vice versa, a line finder support pivoted in front of and extending toward said platen, a line finder pivoted on the end of said support so as to be movable from an inactive position to an active line-finding position relative to said platen and vice versa, spring means connected to said line finder adapted to be moved over the center of the pivot thereof to urge said line finder toward either of its positions, and means acting automatically on said pivoted support and on said line finder, as said platen is moved from throwback to printing position with the line finder in active position, for moving said spring past the center of the pivot of said line finder so that, when said platen is next moved from printing position, the line finder will be automatically moved by said spring means to an inactive position.

65. A front-feed machine of the class described having a printing mechanism, a platen movable from a printing position relative to said mechanism to a throwback position and vice versa, a line finder support pivoted in front of and extending toward said platen, means urging said support upwardly about its pivot, a line finder pivoted on the end of said support so that it may be moved from an inactive to an active line-finding position and vice versa, urging means for said line finder adapted to be conditioned to urge said line finder to either of its positions, and means operating automatically, as said platen is moved from throwback to printing position with said line finder in active position, for moving said support downwardly with the line finder remaining in substantially line-finding position and for conditioning the urging means for said line finder so that, when said platen is again moved out of printing position, the line finder will be moved to inactive position while the support returns upwardly.

66. A front-feed machine of the class described having a printing mechanism, a platen for supporting a sheet of record material in printing position relative to said printing mechanism, said platen being movable from a printing position relative to said printing mechanism to a throwback position and vice versa, means for receiving and holding a work sheet in front-fed position relatively to said platen, said means being movable from a closed to an open-throat condition as said platen is moved to throwback position, a line finder movable from an inactive position to either of two active positions differing vertically relative to the printing line on said platen, means for moving said line finder from inactive to one active position for line-finding purposes with said platen in throwback position, and means for moving said line finder to a different active position with said platen in throwback position in which position said line finder supports the upper end of a work sheet in a position to enable the entries on said sheet to be easily read by the operator.

67. A front-feed machine of the class described having a printing mechanism, a platen for supporting a work sheet in printing relation to said printing mechanism, columnar-printing control means for controlling the column in which printing occurs, means for receiving and holding a work sheet in front-fed position relatively to said platen, said means being movable from a closed to an open-throat condition and vice versa, a line finder movable from an inactive to either of two active positions differing vertically relative to the printing line on said platen, and means controlled automatically in accordance with the column in which printing occurs for determining the active position to which the line finder shall move when it is moved to active position.

68. A front-feed machine of the class described having a printing mechanism, a platen movable from a printing position relative to said printing mechanism to a throwback position and vice versa, means for receiving and holding a work sheet in front-fed position relative to said platen, said means being movable from a closed to an open-throat condition and vice versa, a line finder movable from an inactive position to different active positions relative to said platen, means for moving said line finder from its inactive position to one of said active line-finding positions when said platen is in throwback position and said throat is open, means for moving said platen to throwback position with said front-feed throat closed to enable the operator to read the entry that has just been printed, and means for moving said line finder to another of said active positions when said platen is in throwback position with said throat closed, said line finder having portions acting when moved to said latter position to determine the line that has just been printed and to support the upper end of the work sheet in a position to enable the entries on said sheet to be easily read by the operator.

69. A front-feed machine of the class described having a printing mechanism, a platen movable from a printing position relative to said printing mechanism to a throwback position and vice versa, means for receiving and holding a work sheet in front-fed position relative to said platen, said means being movable from a closed to an open-throat condition and vice versa, a combination paper table and line finder movable from a sheet-receiving position to different sheet-holding and line-finding positions relative to said platen, means for moving said combination table and line finder from sheet-receiving to one of said sheet-holding and line-finding positions when said platen is in throwback position with said throat open, means for moving said platen to throwback position with said front-feed throat closed to enable the operator to read the entry that has just been typed, and means for moving said combination paper table and line finder to another of said sheet-holding and line-finding positions when said platen is in throwback position with said throat closed, whereby said line finder determines the line that has just been printed and said paper table holds the work sheet in a position to enable the entries on said sheet to be easily read by the operator.

70. A front-feed machine of the class described having a printing mechanism, a platen movable from a printing position relative to said printing mechanism to a throwback position and vice versa, means for receiving and holding a work sheet in front-fed position relative to said platen, said means being movable from a closed to an open-throat condition and vice versa, a line finder movable from an inactive position to different active positions relative to said platen, means for moving said line finder from inactive position to one of said active line-finding positions when said platen is in throwback position and said throat is open, means for moving said platen to throwback position with said front-feed throat closed to enable the operator to read the entry that has just been printed, and means acting automatically, as said platen is being so moved for reading the entries, to move said line finder to another of said active positions, said line finder having portions acting, when moved to said latter position, to determine the line that has just been printed and to support the upper end of the work sheet in a position to enable the entries on said sheet to be easily read by the operator.

71. A combination front-feed paper table and sheet-guiding device for facilitating the feeding of work sheets in front of a platen comprising a pair of fingers, each of which has spring arms slidably mounted on a shaft with the arms set so that they hold the fingers in position but so that, when the arms are sprung slightly, the fingers may be moved along said shaft to different positions, said fingers having lateral projections adapted to act, when said device is in sheet-receiving position, as a paper table to support a work sheet when it is front fed, and upwardly extending projections on said fingers serving as side guides for the inserted sheet.

72. A combination front-feed paper table and sheet-guiding device for facilitating the feeding of work sheets in front of a platen, said device being movable from a sheet-receiving to a sheet-holding position and vice versa and comprising a pair of fingers, each of which has spring arms slidably mounted on a shaft with the arms set so that they hold the fingers in position but so that, when the fingers are sprung slightly, the fingers may be moved laterally on said shaft to different positions, said fingers having lateral projections adapted to act, when said device is in sheet-receiving position, as a paper table to support a work sheet when it is front fed, and upwardly curved projections on said fingers serving as side guides for the inserted sheet, said lateral projections on said fingers also serving to hold the sheet about the platen when the paper table and guiding device is in sheet-holding position.

73. A machine of the class described having a printing mechanism, front-feed means for receiving and holding a work sheet in front-fed position relative to said printing mechanism, said front-feed means being movable from closed-throat to open-throat condition and reversely but being urged to closed-throat condition, an electric motor and connections for moving said front-feed means to closed-throat condition, said motor and connections governing the closing of said throat so as to close the same in a uniform quiet manner.

ROBERT L. MULLER.

DISCLAIMER 2,288,916.—*Robert L. Muller*, Detroit, Mich. CALCULATING MACHINE. Patent dated July 7, 1942. Disclaimer filed April 15, 1944, by the assignee, *Burroughs Adding Machine Company*.

Hereby enters this disclaimer to claims 14, 15, and 16 of said Letters Patent.

[*Official Gazette May 16, 1944.*]

DISCLAIMER 2,288,916.—*Robert L. Muller*, Detroit, Mich. CALCULATING MACHINE. Patent dated July 7, 1942. Disclaimer filed April 15, 1944, by the assignee, *Burroughs Adding Machine Company*.

Hereby enters this disclaimer to claims 14, 15, and 16 of said Letters Patent.

[*Official Gazette May 16, 1944.*]